US011784707B2

(12) United States Patent
Nam et al.

(10) Patent No.: US 11,784,707 B2
(45) Date of Patent: Oct. 10, 2023

(54) TECHNIQUES FOR SIDELINK RELAY

(71) Applicant: QUALCOMM Incorporated, San Diego, CA (US)

(72) Inventors: Wooseok Nam, San Diego, CA (US); Tao Luo, San Diego, CA (US); Juan Montojo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 16/942,399

(22) Filed: Jul. 29, 2020

(65) Prior Publication Data

US 2021/0036763 A1 Feb. 4, 2021

Related U.S. Application Data

(60) Provisional application No. 62/882,305, filed on Aug. 2, 2019.

(51) Int. Cl.
*H04B 7/155* (2006.01)
*H04L 1/1812* (2023.01)

(52) U.S. Cl.
CPC ....... *H04B 7/15507* (2013.01); *H04L 1/1812* (2013.01)

(58) Field of Classification Search
CPC ............ H04B 7/15507; H04B 7/15528; H04L 1/1812; H04L 1/1864; H04L 1/1861; H04L 2001/0097; H04L 1/22; H04L 1/1614; H04L 1/08
See application file for complete search history.

(56) References Cited

U.S. PATENT DOCUMENTS

| | | | |
|---|---|---|---|
| 2014/0173372 A1 | 6/2014 | Maaref et al. | |
| 2018/0206167 A1 | 7/2018 | Jactat | |
| 2019/0312688 A1* | 10/2019 | Baldemair | H04W 52/48 |
| 2020/0059341 A1* | 2/2020 | Zhang | H04L 5/0007 |
| 2020/0106566 A1* | 4/2020 | Yeo | H04W 28/04 |
| 2020/0127775 A1* | 4/2020 | Su | H04L 1/1854 |
| 2020/0229179 A1* | 7/2020 | Fan | H04W 72/0413 |
| 2020/0259600 A1* | 8/2020 | Cao | H04L 1/1819 |
| 2020/0374040 A1* | 11/2020 | Lou | H04L 1/1614 |
| 2021/0075552 A1* | 3/2021 | Huang | H04W 64/00 |
| 2021/0135791 A1* | 5/2021 | Wang | H04W 72/1278 |

(Continued)

FOREIGN PATENT DOCUMENTS

WO 2010005951 A2 1/2010

OTHER PUBLICATIONS

International Search Report and Written Opinion—PCT/US2020/044332—ISA/EPO—dated Nov. 9, 2020.

*Primary Examiner* — Abdullahi Ahmed
(74) *Attorney, Agent, or Firm* — Arent Fox, LLP

(57) ABSTRACT

In an aspect, the present disclosure includes a method, apparatus, and computer readable medium for wireless communications for receiving, by a relay node via a first link, one or more first transport block portions of a first transport block; attempting to decode each of the first transport block portions; encoding each successfully decoded first transport block portions to define one or more second transport block portions; and transmitting, via a second link, the one or more second transport block portions.

30 Claims, 13 Drawing Sheets

(56) References Cited

U.S. PATENT DOCUMENTS

| | | | |
|---|---|---|---|
| 2021/0176011 A1* | 6/2021 | Lei | H04W 72/042 |
| 2021/0226740 A1* | 7/2021 | Lei | H04L 1/0079 |
| 2021/0243781 A1* | 8/2021 | Lei | H04W 72/14 |
| 2021/0321396 A1* | 10/2021 | Li | H04L 1/1887 |

* cited by examiner

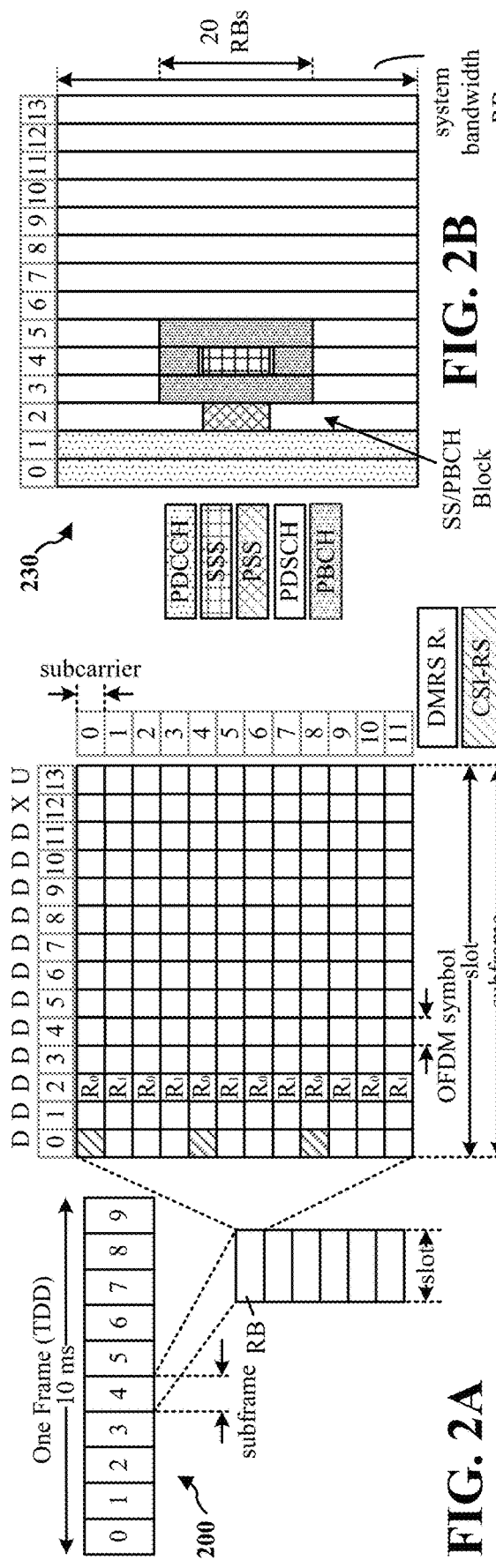
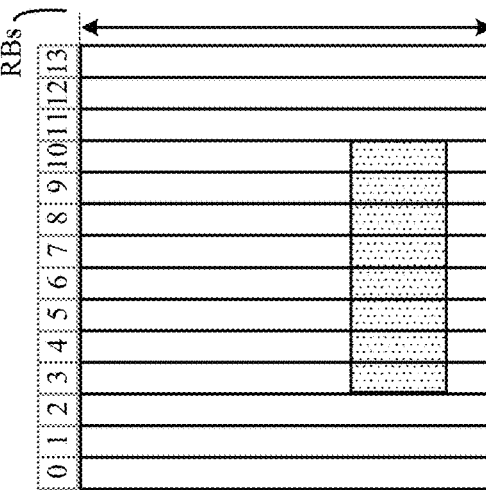
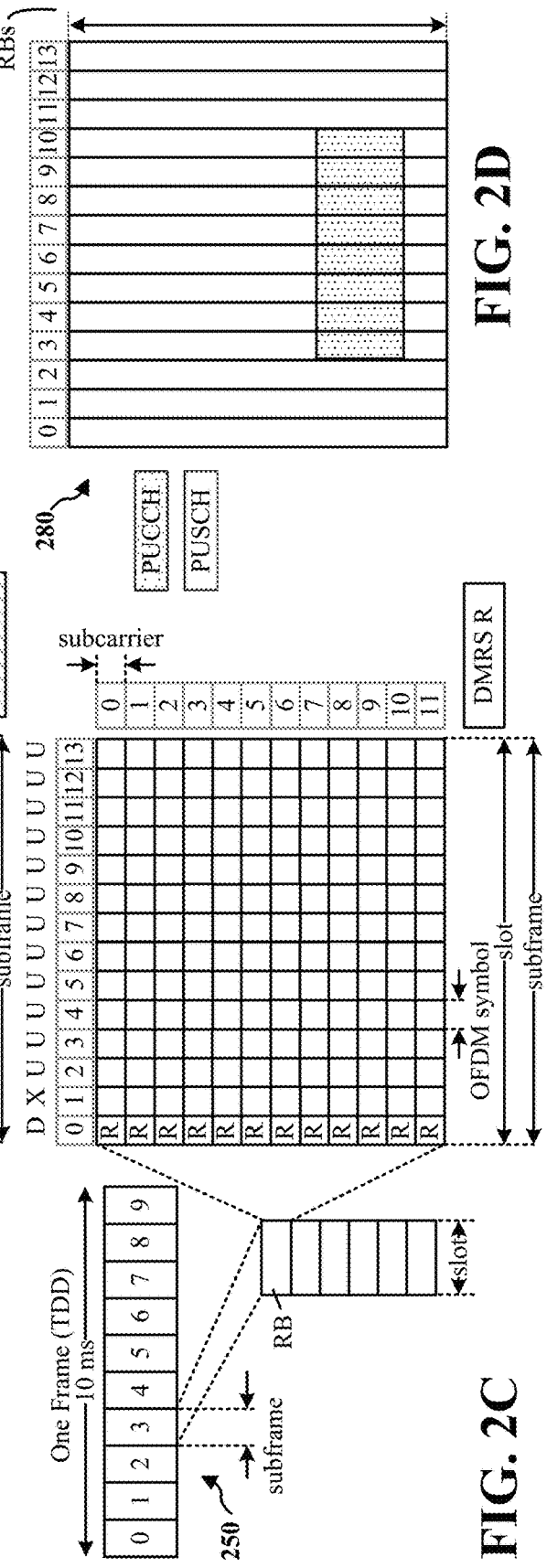
FIG. 2A  FIG. 2B  FIG. 2C  FIG. 2D

TECHNIQUES FOR SIDELINK RELAY

This application claims the benefit of and priority to U.S. Provisional Application No. 62/882,305 titled "CBG-BASED SIDELINK RELAY," filed Aug. 2, 2019, which is assigned to the assignee hereof, and incorporated herein by reference in its entirety.

BACKGROUND

Technical Field

The present disclosure relates generally to wireless communication systems, and more particularly, to techniques for sidelink relay.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that may communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which may be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communications by a relay node is provided. The method may include receiving, via a first link, one or more first transport block portions of a first transport block. The method may further include attempting to decode each of the first transport block portions. The method may further include encoding each successfully decoded first transport block portions to define one or more second transport block portions. The method may further include transmitting, via a second link, the one or more second transport block portions.

According to another example, an apparatus (e.g., a relay node) for wireless communication is provided. The apparatus may include a memory and at least one processor coupled with the memory. The at least one processor may be configured to receive, via a first link, one or more first transport block portions of a first transport block. The at least one processor may be further configured to attempt to decode each of the first transport block portions. The at least one processor may be further configured to encode each successfully decoded first transport block portions to define one or more second transport block portions. The at least one processor may be further configured to transmit, via a second link, the one or more second transport block portions.

According to another example, an apparatus (e.g., a relay node) for wireless communication is provided. The apparatus may include means for receiving, via a first link, one or more first transport block portions of a first transport block. The apparatus may further include means for attempting to decode each of the first transport block portions. The apparatus may further include means for encoding each successfully decoded first transport block portions to define one or more second transport block portions. The apparatus may further include means for transmitting, via a second link, the one or more second transport block portions.

According to another example, a non-transitory computer-readable medium storing computer executable code is provided. The code when executed by a processor causes the processor to receive, via a first link, one or more first transport block portions of a first transport block. The code when executed by a processor further causes the processor to attempt to decode each of the first transport block portions. The code when executed by a processor further causes the processor to encode each successfully decoded first transport block portions to define one or more second transport block portions. The code when executed by a processor further causes the processor to transmit, via a second link, the one or more second transport block portions.

According to another example, a method of wireless communications by a user equipment (UE) is provided. The method may include receiving, via an access link, one or more first transport block portions of a first downlink transport block from a base station. The method may further include receiving, from another link, one or more second transport block portions of the first downlink transport block from a relay node. The one or more second transport block portions received from the relay node comprise the one or more second transport block portions that the relay node successfully decoded.

According to another example, an apparatus (e.g., a UE) for wireless communication is provided. The apparatus may include a memory and at least one processor coupled with the memory. The at least one processor may be configured to receive, via an access link, one or more first transport block portions of a first downlink transport block from a base station. The at least one processor may be further configured to receive, from another link, one or more second transport block portions of the first downlink transport block from a relay node. The one or more second transport block portions received from the relay node comprise the one or more second transport block portions that the relay node successfully decoded.

According to another example, an apparatus (e.g., a UE) for wireless communication is provided. The apparatus may include means for receiving, via an access link, one or more first transport block portions of a first downlink transport block from a base station. The apparatus may include means for receiving, from another link, one or more second transport block portions of the first downlink transport block from a relay node. The one or more second transport block portions received from the relay node comprise the one or more second transport block portions that the relay node successfully decoded.

According to another example, a non-transitory computer-readable medium storing computer executable code is provided. The code when executed by a processor causes the processor to receive, via an access link, one or more first transport block portions of a first downlink transport block from a base station. The code when executed by a processor further causes the processor to receive, from another link, one or more second transport block portions of the first downlink transport block from a relay node. The one or more second transport block portions received from the relay node comprise the one or more second transport block portions that the relay node successfully decoded.

According to another example, a method of wireless communications by a user equipment (UE) is provided. The method may include transmitting, via an access link, one or more first transport block portions of a first uplink transport block to a base station. The method may further include transmitting, via another link, one or more second transport block portions of the first uplink transport block to a relay node.

According to another example, an apparatus (e.g., a UE) for wireless communication is provided. The apparatus may include a memory and at least one processor coupled with the memory. The at least one processor may be configured to transmit, via an access link, one or more first transport block portions of a first uplink transport block to a base station. The at least one processor may be further configured to transmit, via another link, one or more second transport block portions of the first uplink transport block to a relay node.

According to another example, an apparatus (e.g., a UE) for wireless communication is provided. The apparatus may include means for transmitting, via an access link, one or more first transport block portions of a first uplink transport block to a base station. The apparatus may further include means for transmitting, via another link, one or more second transport block portions of the first uplink transport block to a relay node.

According to another example, a non-transitory computer-readable medium storing computer executable code is provided. The code when executed by a processor causes the processor to transmit, via an access link, one or more first transport block portions of a first uplink transport block to a base station. The code when executed by a processor further causes the processor to transmit, via another link, one or more second transport block portions of the first uplink transport block to a relay node.

According to another example, a method of wireless communications by a base station is provided. The method may include receiving, via an access link, one or more first transport block portions of a first uplink transport block from a user equipment (UE). The method may further include receiving, from another link, one or more second transport block portions of the first uplink transport block from a relay node. The one or more second transport block portions received from the relay node comprise the one or more second transport block portions that the relay node successfully decoded.

According to another example, an apparatus (e.g., a base station) for wireless communication is provided. The apparatus may include a memory and at least one processor coupled with the memory. The at least one processor may be configured to receive, via an access link, one or more first transport block portions of a first uplink transport block from a user equipment (UE). The at least one processor may be further configured to receive, from another link, one or more second transport block portions of the first uplink transport block from a relay node. The one or more second transport block portions received from the relay node comprise the one or more second transport block portions that the relay node successfully decoded.

According to another example, an apparatus (e.g., a base station) for wireless communication is provided. The apparatus may include means for receiving, via an access link, one or more first transport block portions of a first uplink transport block from a user equipment (UE). The apparatus may further include means for receiving, from another link, one or more second transport block portions of the first uplink transport block from a relay node. The one or more second transport block portions received from the relay node comprise the one or more second transport block portions that the relay node successfully decoded.

According to another example, a non-transitory computer-readable medium storing computer executable code is provided. The code when executed by a processor causes the processor to receive, via an access link, one or more first transport block portions of a first uplink transport block from a user equipment (UE). The code when executed by a processor further causes the processor to receive, from another link, one or more second transport block portions of the first uplink transport block from a relay node. The one or more second transport block portions received from the relay node comprise the one or more second transport block portions that the relay node successfully decoded.

According to another example, a method of wireless communications by a base station is provided. The method may include transmitting, via an access link, one or more first transport block portions of a first downlink transport block to a user equipment (UE). The method may further include transmitting, via another link, one or more second transport block portions of the first downlink transport block to a relay node.

According to another example, an apparatus (e.g., a base station) for wireless communication is provided. The apparatus may include a memory and at least one processor coupled with the memory. The at least one processor may be configured to transmit, via an access link, one or more first transport block portions of a first downlink transport block to a user equipment (UE). The at least one processor may be further configured to transmit, via another link, one or more second transport block portions of the first downlink transport block to a relay node.

According to another example, an apparatus (e.g., a base station) for wireless communication is provided. The apparatus may include means for transmitting, via an access link, one or more first transport block portions of a first downlink transport block to a user equipment (UE). The apparatus may further include means for transmitting, via another link, one or more second transport block portions of the first downlink transport block to a relay node.

According to another example, a non-transitory computer-readable medium storing computer executable code is provided. The code when executed by a processor causes the processor to transmit, via an access link, one or more first transport block portions of a first downlink transport block to a user equipment (UE). The code when executed by a processor further causes the processor to transmit, via another link, one or more second transport block portions of the first downlink transport block to a relay node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame, in accordance with certain aspects of the present description.

FIG. 2B is a diagram illustrating an example of DL channels within a 5G NR subframe, in accordance with certain aspects of the present description.

FIG. 2C is a diagram illustrating an example of a second 5G NR frame, in accordance with certain aspects of the present description.

FIG. 2D is a diagram illustrating an example of UL channels within a 5G NR subframe, in accordance with certain aspects of the present description.

DETAILED DESCRIPTION

Figure 1:
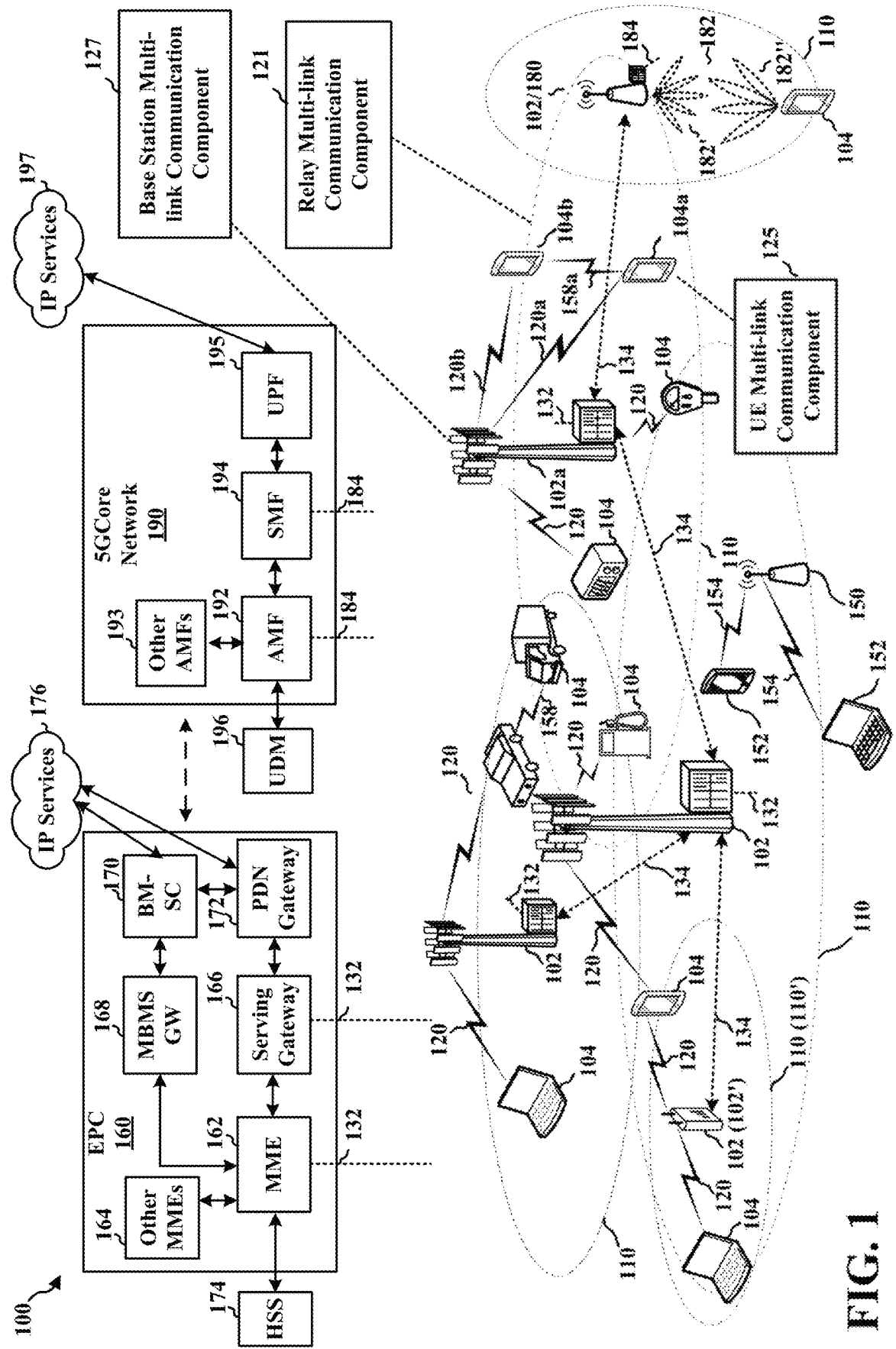
FIG. 1 is a schematic diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to techniques for sidelink relay communications, which may, for example, be used by a relay UE in relaying communications from a base station over a sidelink to a multi-link UE, or from the multi-link UE to the base station via the relay UE. In certain example implementations, a multi-link UE having a direct access link to a base station may be referred to as a sidelink-assisted multi-link UE. A sidelink-assisted multi-link UE may, for example, establish a multi-link communication with one or more base stations over two or more communication links, which may include at least one direct link and at least one indirect link via a sidelink with the relay UE. Such multi-link communication techniques may be beneficial, for example, by increasing diversity and/or throughput in some instances.

The present disclosure relates to techniques for sidelink relay communication or the like. As described in greater detail herein, in certain example aspects, techniques are provided for transport block portion-based (or code block group (CBG) based) sidelink relay communication. For example, the present disclosure provides techniques that may be implemented, at least in part, in apparatuses and/or methods in which a relay node (e.g., a relay UE) may receive one or more first transport block portions of a first transport block, attempt to decode each of the first transport block portions, encode each successfully decoded first transport block portions to define one or more second transport block portions, and transmit the one or more second transport block portions. The second transport block portions may, for example, be transmitted to a base station, a receiving UE, and/or other like wireless communication device. In certain implementations, such a receiving wireless communication device may combine two or more received second transport block portions, e.g., before or after decoding the received transport block portions. These example techniques and others are discussed in detail below with regard to FIGS. 1-13.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104b may include a relay multi-link communication component 121 for assisting with sidelink relay communications between a base station 102a and a sidelink-assisted multi-link UE 104a. The sidelink-assisted multi-link UE 104a may have a first access link 120a directly with the base station 102a, and a second communication link with the base station 102a via a sidelink 158a with the relay UE 104b, which has a second access link 120b to the base station 102a.

Correspondingly, the sidelink-assisted multi-link UE 104a may include a UE multi-link communication component 125 configured to manage communications with both the relay UE 104b via the sidelink 158a and the base station 102a via the access link 120a.

Similarly, the base station 102a may include a base station multi-link communication component 127 configured to manage communications with both the relay UE 104b via the access link 120b and the sidelink-assisted multi-link UE 104a via the access link 120a.

Further details of these sidelink relay operational modes and operations performed by the relay UE 104b, the sidelink-assisted multi-link UE 104a, and the base station 102a are discussed in more detail below.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers may be dedicated for DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/non-acknowledgement (ACK/NACK) feedback. The PUSCH carries data, and may additionally be used to carry a buffer status report (BSR), a power headroom report (PHR), and/or UCI.

Figure 3:
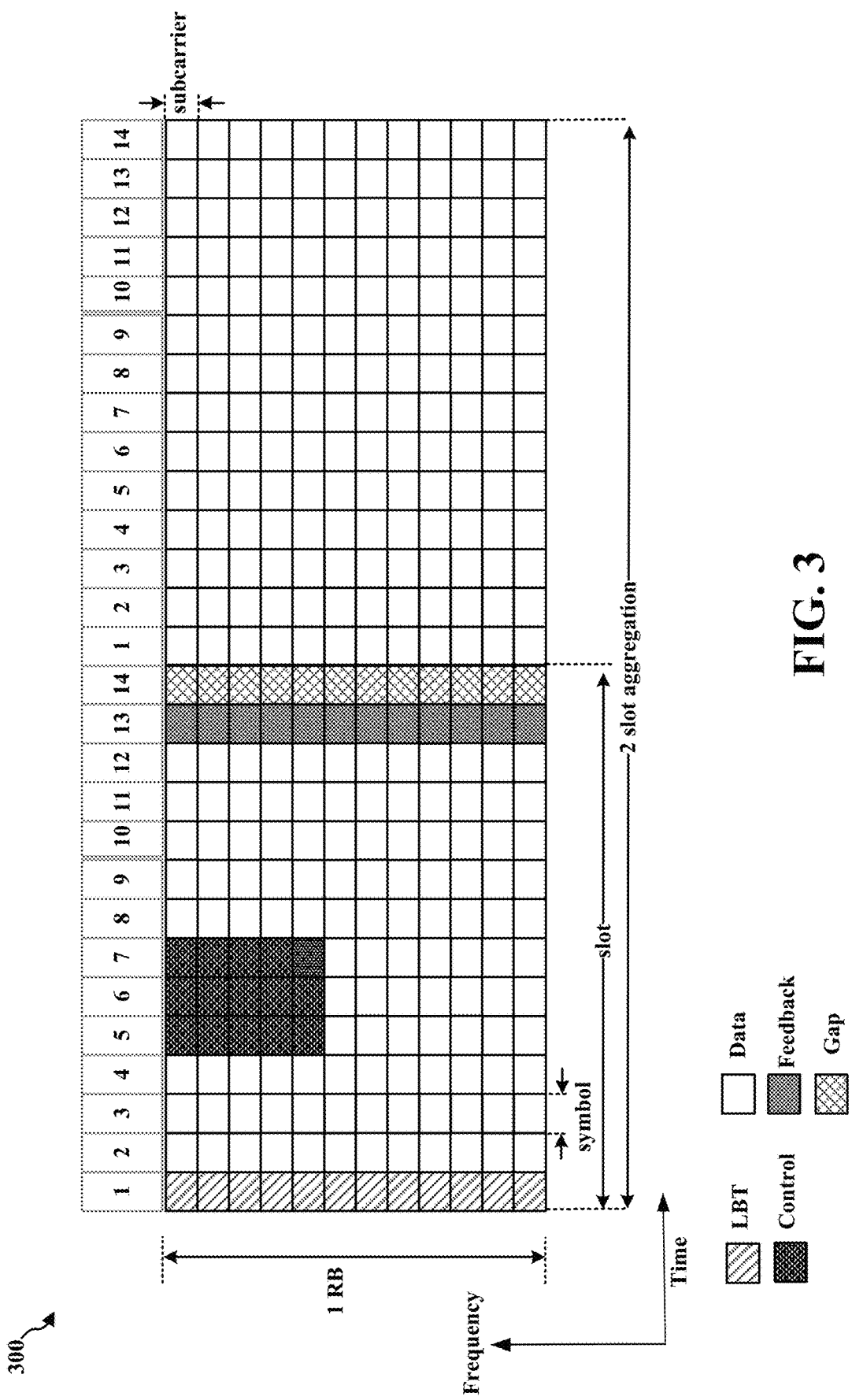
FIG. 3 is a diagram of an example frame structure and resources for sidelink communications between two of the communicating nodes in the system of FIG. 1, in accordance with various aspects of the present description.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
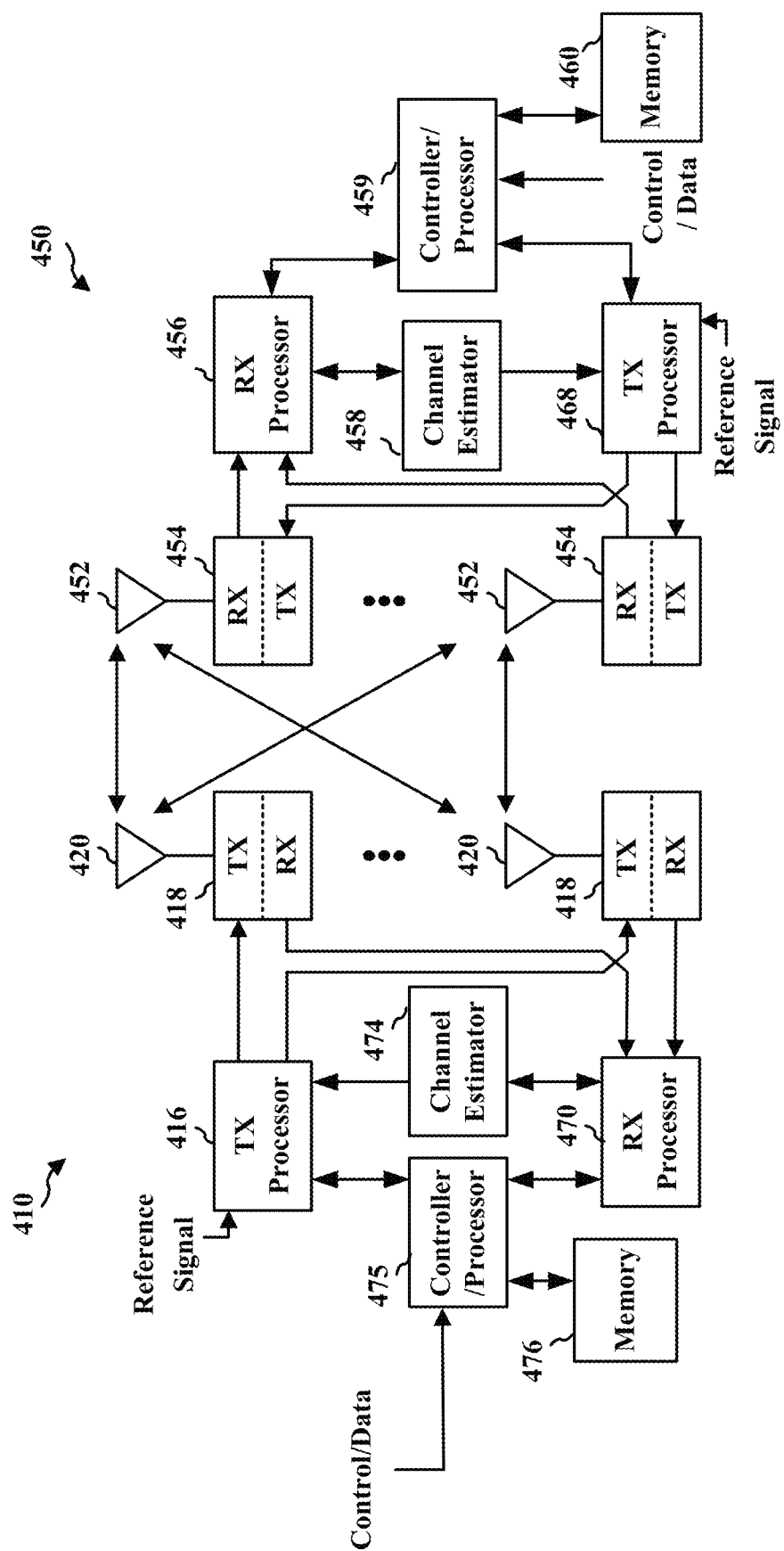
FIG. 4 is a schematic diagram of an example of hardware components of two of the communicating nodes in the system of FIG. 1, in accordance with various aspects of the present description.

FIG. 4 is a block diagram of hardware components of an example transmitting and/or receiving (tx/rx) nodes 410 and 450, which may be any combinations of a base station 102-UE 104 communications, and/or UE 104-UE 104 communications in a system 100. For example, such communications may include, but are not limited to, communications such as a base station transmitting to a relay UE, a relay UE transmitting to a multi-link UE, a multi-link UE transmitting to a relay UE, or a relay UE transmitting to a base station in an access network. In one specific example, the tx/rx node 410 may be an example implementation of base station 102 and where tx/rx node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 may be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 may be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
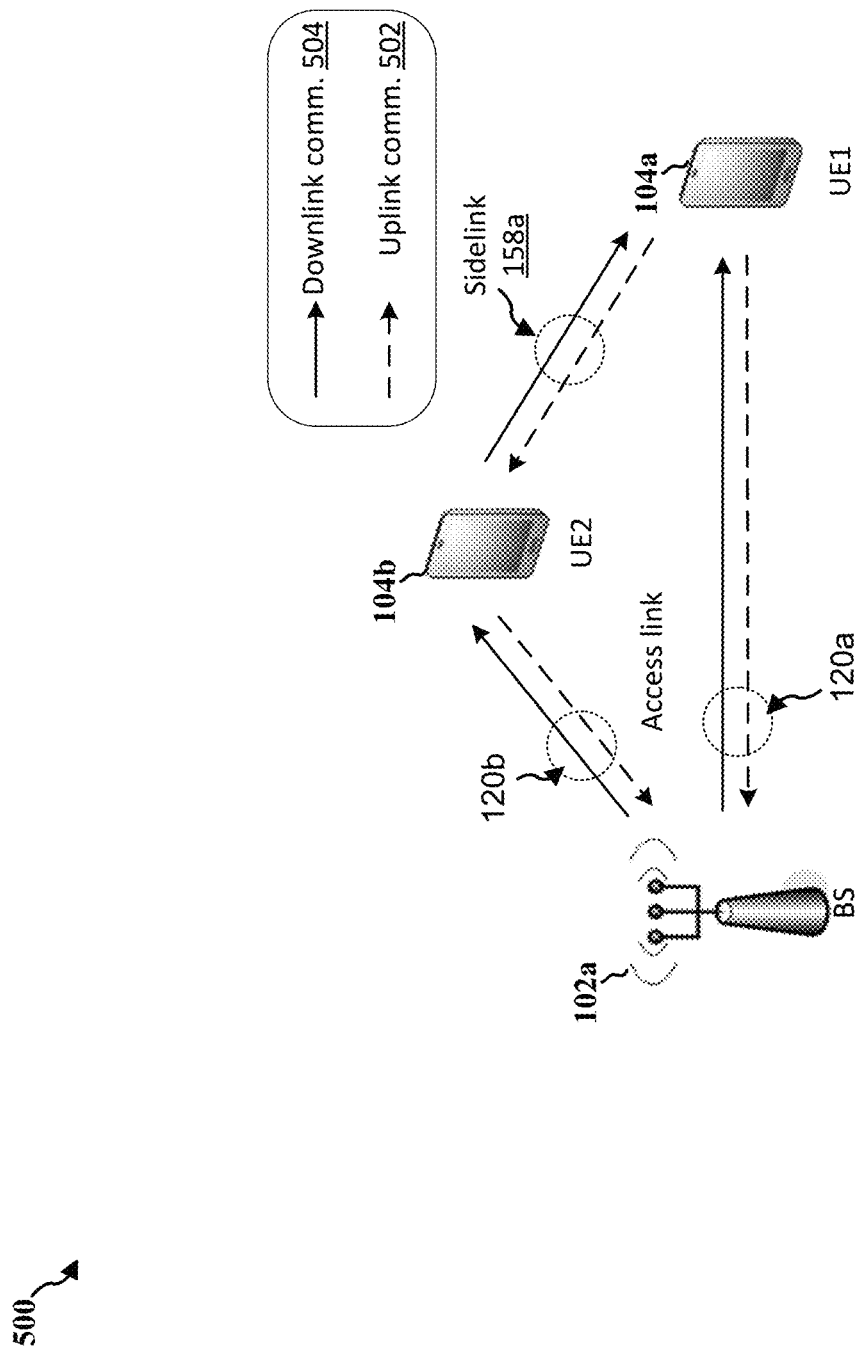
FIG. 5 is a schematic diagram of an example of a sidelink relay communication configuration operable in the system of FIG. 1, in accordance with various aspects of the present description.
Figure 6:
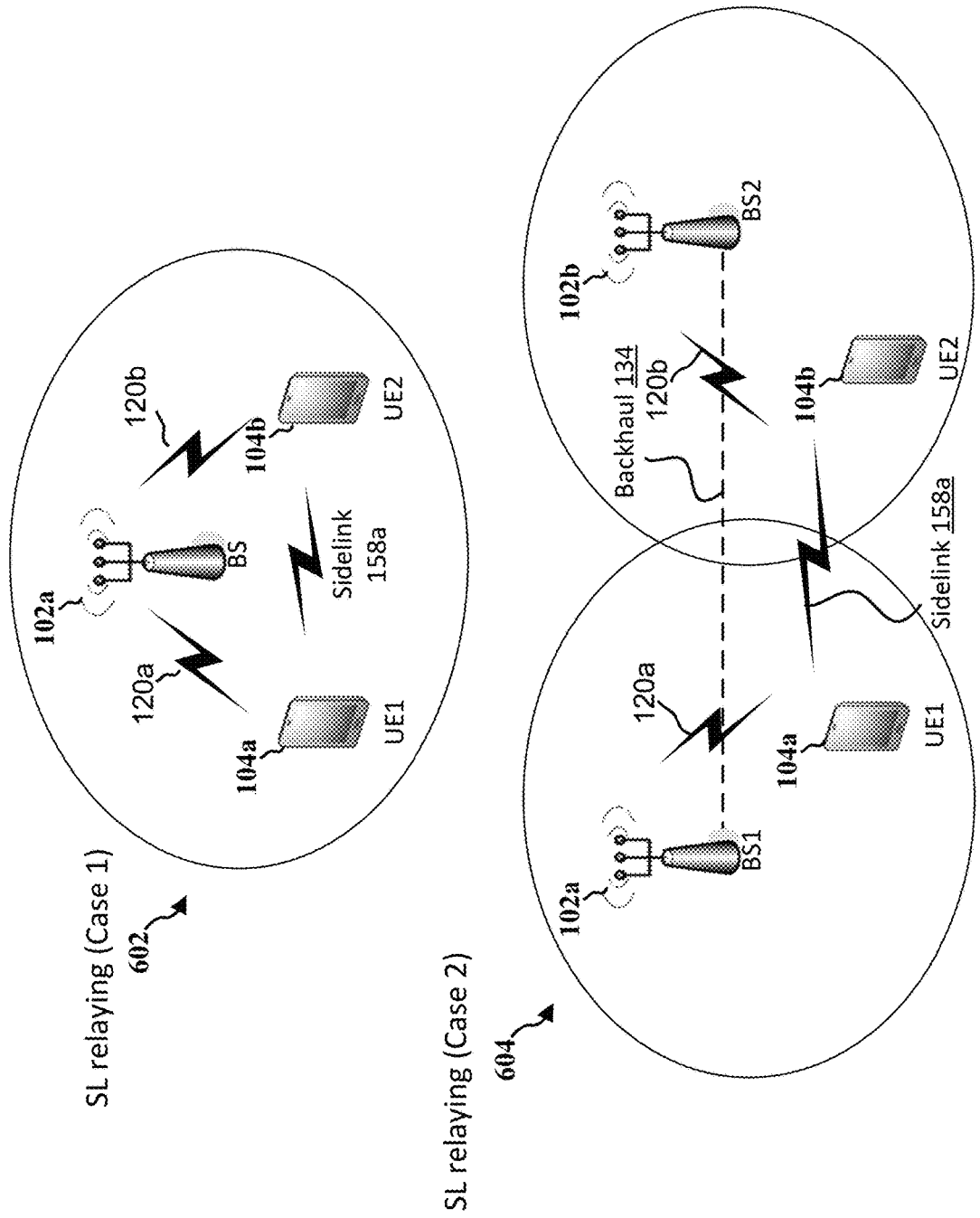
FIG. 6 is a schematic diagram of two different examples of a sidelink relay communication configuration operable in the system of FIG. 1, in accordance with various aspects of the present description.

Referring to FIGS. 5 and 6, the present aspects generally relate to a sidelink relay communication scenario 500, 602, and/or 604 that includes relaying communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, 602, and/or 604, a sidelink-assisted multi-link UE 104a may establish a multi-link communication with one or more base stations 102a and/or 102b over two or more communication links, which include at least one direct link and at least one indirect link via a sidelink with a relay UE 104b. In a first case, such as in the sidelink relay communication scenarios 500 and 602, the sidelink-assisted multi-link UE 104a directly communicates with the base station 102a via a first access link (AL) 120a, and indirectly communicates with the base station 102a via a sidelink 158a with the relay UE 104b, which has a second access link 120b with the base station 102a. In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. The example sidelink relay communication scenarios 500, 602, and/or 604 may, in certain instances, potentially increase diversity, e.g., sending the same data over two links (access link and sidelink), and/or throughput, e.g., sending different independent data over multiple links. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 604, the sidelink-assisted multi-link UE 104a may establish multiple links with multiple base stations 102a and 102b, which may be referred to as a multi-transmit-receive point (multi-TRP) architecture. In this case, the sidelink-assisted multi-link UE 104a directly communicates with the base station 102a via a first access link (AL) 120a, and indirectly communicates with the base station 102b via a sidelink 158a with the relay UE 104b, which has a second access link 120b with the base station 102b. Additionally, in this case, the base stations 102a and 102b may exchange communications over a backhaul link 134a.

Additionally, in the sidelink relay communication scenario 500, 602, and/or 604, the communications exchanged between the base station 102a/102b, relay UE 104b, and sidelink-assisted multi-link UE 104a may be uplink (UL) communications 502 and/or downlink (DL) communications 504 (see FIG. 5).

The present disclosure includes, by way of further examples, techniques in accord with the sidelink relay communication scenario 500, 602, and/or 604 (FIGS. 5 and 6), and in particular to transport block portion-based (or code block group (CBG) based) sidelink relaying. In a particular example, the relay UE 104b may be configured to only transmit successfully decoded transport block portions (or CBGs), to the sidelink-assisted multi-link UE 104a, e.g., in a DL communication 504, or to the base station 102a or 102b, e.g., in a UL communication 502.

In certain example downlink communications, the relay UE 104*b* may be configured to only forward successfully decoded transport block portions (or CBGs), to the sidelink-assisted multi-link UE 104*a*. The relay UE 104*b* may send a sidelink control message comprising an index indicating the successfully decoded transport block portions (or CBGs), e.g., via a code block group transmit index (CBGTI) bitmap. For example, the sidelink control message may be sent via a physical sidelink control channel (PSCCH). The sidelink-assisted multi-link UE 104*a* may decode the transport block portions (or CBGs) after combining the transport block portions (or CBGs) received via the access link 120*a* and the transport block portions (or CBGs) received via the sidelink 158*a*. The sidelink-assisted multi-link UE 104*a* may send HARQ-ACK feedback on one or both of the access link 120*a* and/or the sidelink 158*a*. One or both of the base station 102*a* or 102*b* and/or the relay UE 104*b* may retransmit NACK-ed transport block portions (or CBGs) to the sidelink-assisted multi-link UE 104*a*. In an aspect, the sidelink-assisted multi-link UE 104*a* may send a retransmission grant on one or both of the access link 120*a* and/or the sidelink 158*a*. One or both of the base station 102*a* or 102*b* and/or the relay UE 104*b* may retransmit transport block portions (or CBGs) indicated in the retransmission grant to the sidelink-assisted multi-link UE 104*a*.

In certain example uplink communications, the relay UE 104*b* may be configured to only forward successfully decoded transport block portions (or CBGs), to the base station 102*a* or 102*b*. The relay UE 104*b* may send an uplink control message including information (e.g., which transport block portions (or CBGs) that were sent) about the indexes. For example, uplink control message may be uplink control information (UCI). The base station 102*a* or 102*b* may decode the transport block portions (or CBGs) after combining the transport block portions (or CBGs) received via the access link 120*a* and the transport block portions (or CBGs) received via another access link 120*b*. The base station 102*a* or 102*b* may send HARQ-ACK feedback on one or both of the access link 120*a* and/or the access link 120*b*. One or both of the sidelink-assisted multi-link UE 104*a* and/or the relay UE 104*b* may retransmit NACK-ed transport block portions (or CBGs) to the base station 102*a* or 102*b*. In an aspect, the base station 102*a* or 102*b* may send a retransmission grant on one or both of the access link 120*a* and/or the access link 120*b*. One or both of the sidelink-assisted multi-link UE 104*a* and/or the relay UE 104*b* may retransmit transport block portions (or CBGs) indicated in the retransmission grant to the base station 102*a* or 102*b*.

Figure 7:
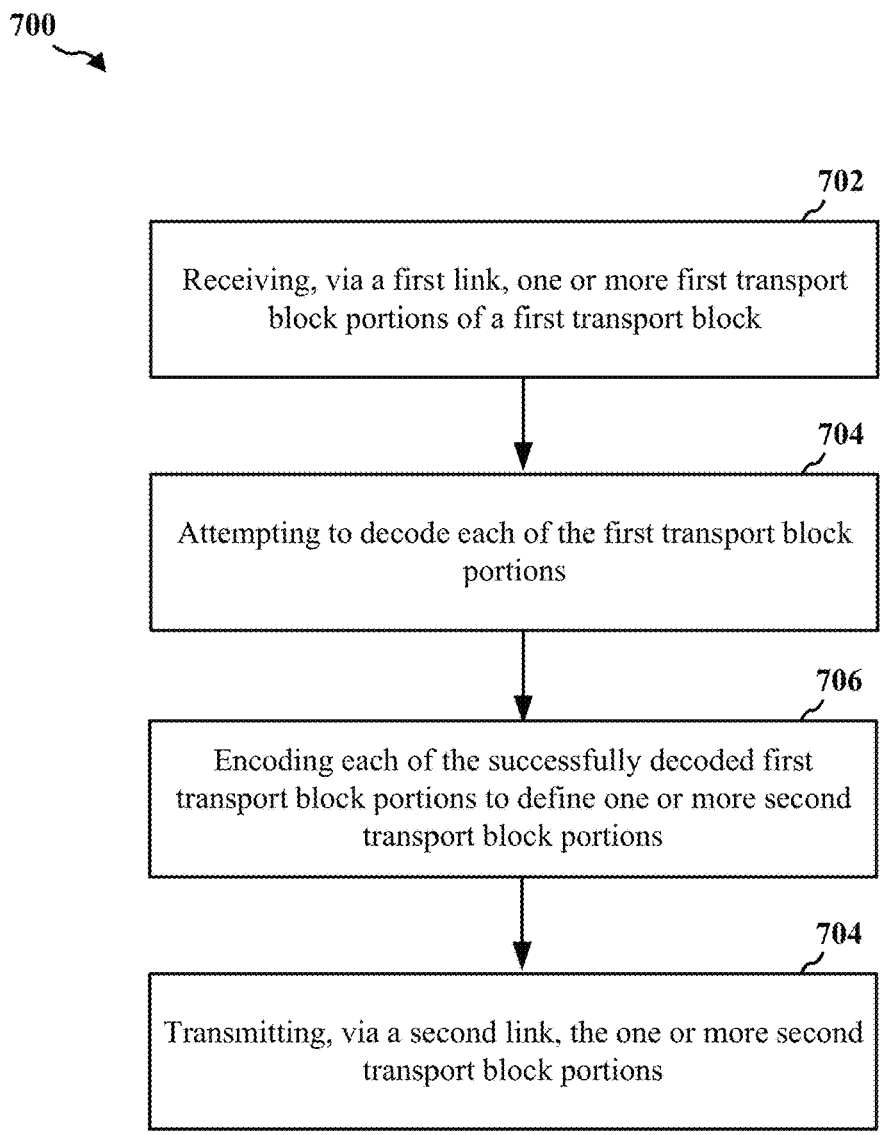
FIG. 7 is a flowchart of an example method of wireless communication of a relay UE operable in the system of FIG. 1, in accordance with various aspects of the present description.

Referring to FIG. 7, an example method 700 of wireless communication may be performed by the relay UE 104*b*.

At 702, method 700 includes receiving, via a first link, one or more first transport block portions of a first transport block. For example, the relay node 104*b*, the processor 1212, and/or the relay multi-link communication component 121 may receive one or more first transport block portions (or CBGs) transmitted by a base station 102*a* or 102*b* via an access link 120*b* (e.g., a first link) or by a sidelink-assisted multi-link UE 104*a* (e.g., a transmitting UE 104*a*) via a sidelink 158*a* (e.g., a first link). Accordingly, the relay node 104*b*, the processor 1212, and/or the relay multi-link communication component 121 may provide means for receiving one or more first transport block portions of a first transport block.

One or more of the first transport block portions (or CBGs) received by the relay node 104*b* may be duplicative of at least one transport block portion (or CBGs) that is transmitted by the base station 102*a* or that is transmitted by the sidelink-assisted multi-link UE 104*a* (e.g., a transmitting UE 104*a*) on the access link 120*a*. For example, the base station 102*a* or 102*b* may transmit CBG$_1$ to the relay node 104*b* (e.g., another network entity) and the base station 102*a* may transmit CBG$_1$ to the sidelink-assisted multi-link 104*a* for reliability. One or more of the first transport block portions (or CBGs) received by the relay node 104*b* may be different from at least one transport block portion (or CBGs) that is transmitted by the base station 102*a* or that is transmitted by the sidelink-assisted multi-link UE 104*a* (e.g., a transmitting UE 104*a*) on the access link 120*a*. For example, the base station 102*a* or 102*b* may transmit CBG$_1$ and CBG$_3$ to the relay node 104*b* (e.g., another network entity) and the base station 102 may transmit CBG$_2$ and CBG$_4$ to the sidelink-assisted multi-link 104*a* for efficiency.

At 704, method 700 includes attempting to decode each of the one or more first transport block portions. For example, the relay node 104*b*, the processor 1212, and/or the relay multi-link communication component 121 may attempt to decode each of the one or more first transport block portions (or CBGs). Accordingly, the relay node 104*b*, the processor 1212, and/or the relay multi-link communication component 121 may provide means for attempting to decode each of the one or more first transport block portions (or CBGs).

At 706, method 700 includes encoding each successfully decoded first transport block portions to define or more second transport block portions. For example, the relay node 104*b*, the processor 1212, and/or the relay multi-link communication component 121 may encode each successfully decoded first transport block portions (or CBGs) to define one or more second transport block portions (or CBGs). Accordingly, the relay node 104*b*, the processor 1212, and/or the relay multi-link communication component 121 may provide means for encoding each successfully decoded first transport block portions (or CBGs) to define one or more second transport block portions (or CBGs).

At 708, method 700 includes transmitting, via a second link, the one or more second transport block portions. For example, the relay node 104*b*, the processor 1212, and/or the relay multi-link communication component 121 may transmit the one or more second transport block portions (or CBGs) to a base station 102*a* or 102*b* via an access link 120*b* (e.g., a second link) or to a sidelink-assisted multi-link UE 104*a* (e.g., a transmitting UE 104*a*) via a sidelink 158*a* (e.g., a second link). Accordingly, the relay node 104*b*, the processor 1212, and/or the relay multi-link communication component 121 may provide means for transmitting the one or more second transport block portions (or CBGs).

In some implementations, method 700 may further include omitting unsuccessfully decoded ones of the plurality of first transport block portions from the one or more second transport block portions.

In some implementations, method 700 may further include transmitting a sidelink control message comprising an index of the one or more second transport block portions to a receiving UE, with the index indicating which of the first transport block portions were successfully decoded. For example, the relay node 104*b*, the processor 1212, and/or the relay multi-link communication component 121 may transmit a sidelink control message (via PS SCH) comprising an index of the one or more second transport block portions (or CBGs) to the sidelink-assisted multi-link UE 104*a* (e.g., a receiving UE 104*a*) with the index indicating which of the first transport block portions (or CBGs) were successfully decoded. Accordingly, the relay node 104*b*, the processor 1212, and/or the relay multi-link communication component

121 may provide means for transmitting a sidelink control message comprising an index of the one or more second transport block portions to a receiving UE, with the index indicating which of the first transport block portions (or CBGs) were successfully decoded.

In some implementations, method 700 may further include receiving, from the receiving UE, HARQ-ACK feedback for the second transport block portions that the receiving UE received. For example, the relay node 104b, the processor 1212, and/or the relay multi-link communication component 121 may receive, from the sidelink-assisted multi-link UE 104a (e.g., a receiving UE), HARQ-ACK feedback for the second transport block portions (or CBGs) that the sidelink-assisted multi-link UE 104a received. Accordingly, the relay node 104b, the processor 1212, and/or the relay multi-link communication component 121 may provide means for receiving HARQ-ACK feedback for the second transport block portions that the receiving UE 104a received.

In some implementations, method 700 may further include retransmitting, to the receiving UE, each of the second transport block portions corresponding to each NACK in the received HARQ-ACK feedback. For example, the relay node 104b, the processor 1212, and/or the relay multi-link communication component 121 may retransmit, to the sidelink-assisted multi-link UE 104a (e.g., a receiving UE 104a), each of the second transport block portions (or CBGs) corresponding to each NACK in the received HARQ-ACK feedback. Accordingly, the relay node 104b, the processor 1212, and/or the relay multi-link communication component 121 may provide means for retransmitting each of the second transport block portions (or CBGs) corresponding to each NACK in the received HARQ-ACK feedback. For example, if the relay node 104a transmitted $CBG_1$ and $CBG_3$ to the sidelink-assisted multi-link UE 104a but the sidelink-assisted multi-link UE 104a was unable to properly decode $CBG_1$, the sidelink-assisted multi-link UE 104a may inform the relay node 104b of the failed decoding. In response, the relay node 104b, the processor 1212, and/or the relay multi-link communication component 121 may retransmit $CBG_1$ to the sidelink-assisted multi-link UE 104a.

In some implementations, method 700 may further include transmitting, to the base station that transmitted the one or more first transport block portions, the HARQ-ACK feedback. For example, the relay node 104b, the processor 1212, and/or the relay multi-link communication component 121 may transmit the HARQ-ACK feedback to the base station 102a or 102b that transmitted the one or more first transport block portions (or CBGs). Accordingly, the relay node 104b, the processor 1212, and/or the relay multi-link communication component 121 may provide means for transmitting the HARQ-ACK feedback. In this implementation, the relay node 104b relays the HARQ-ACK feedback to the base station 102a or 102b. This relaying may be in place of retransmitting the one or more second transport block portions (or CBGs) that have a corresponding NACK or in addition to the retransmission.

In some implementations, method 700 may further include transmitting an uplink control message comprising an index of the one or more second transport block portions to the base station, with the index indicating which of the first transport block portions were successfully decoded. For example, the relay node 104b, the processor 1212, and/or the relay multi-link communication component 121 may transmit an uplink control message, via the access link 120b (e.g., PUCCH or PUSCH), comprising an index of the one or more second transport block portions (or CBGs) to the base station 102a or 102b, with the index indicating which of the first transport block portions (or CBGs) that the relay node 104b was able to successfully decode. Accordingly, the relay node 104b, the processor 1212, and/or the relay multi-link communication component 121 may provide means for transmitting an uplink control message comprising an index of the one or more second transport block portions, with the index indicating which of the first transport block portions were successfully decoded.

In some implementations, method 700 may further include receiving, from the base station, HARQ-ACK feedback for the second transport block portions that the base station received and retransmitting, to the base station, each of the second transport block portions corresponding to each NACK in the received HARQ-ACK feedback. For example, the relay node 104b, the processor 1212, and/or the relay multi-link communication component 121 may receive, from the base station 102a or 102b, HARQ-ACK feedback for the second transport block portions (CBGs) that the base station 102a or 102b received. Accordingly, the relay node 104b, the processor 1212, and/or the relay multi-link communication component 121 may provide means for receiving HARQ-ACK feedback for the second transport block portions that the base station received. The relay node 104b may retransmit, to the base station 102a or 102b, each of the second transport block portions (or CBGs) corresponding to each NACK in the received HARQ-ACK feedback. For example, the relay node 104b, the processor 1212, and/or the relay multi-link communication component 121 may retransmit, to the base station 102a, each of the second transport block portions corresponding to each NACK in the received HARQ-ACK feedback. Accordingly, the relay node 104b, the processor 1212, and/or the relay multi-link communication component 121 may provide means for retransmitting each of the second transport block portions corresponding to each NACK in the received HARQ-ACK feedback.

In some implementations, method 700 may further include receiving, from the base station, a retransmission grant for the second transport block portions that the base station received and retransmitting, to the base station, each of the second transport block portions corresponding to the one or more transport block portions (or CBGs) indicated in the retransmission grant. For example, the relay node 104b, the processor 1212, and/or the relay multi-link communication component 121 may receive, from the base station 102a or 102b, a retransmission grant for the second transport block portions (or CBGs) that the base station 102a or 102b received. Accordingly, the relay node 104b, the processor 1212, and/or the relay multi-link communication component 121 may provide means for receiving a retransmission grant for the second transport block portions (or CBGs) that the base station received. The relay node 104b, the processor 1212, and/or the relay multi-link communication component 121 may retransmit, to the base station 102a or 102b, each of the second transport block portions (or CBGs) corresponding to the one or more transport block portions (or CBGs) indicated in the retransmission grant. Accordingly, the relay node 104b, the processor 1212, and/or the relay multi-link communication component 121 may provide means for retransmitting each of the second transport block portions (or CBGs) corresponding to the one or more transport block portions (or CBGs) indicated in the retransmission grant.

In some implementations, method 700 may further include transmitting, to the receiving UE, the HARQ-ACK feedback. For example, the relay node 104*b*, the processor 1212, and/or the relay multi-link communication component 121 may transmit, to the sidelink-assisted multi-link UE 104*a* (e.g., a receiving UE), the HARQ-ACK feedback. Accordingly, the relay node 104*b*, the processor 1212, and/or the relay multi-link communication component 121 may provide means for transmitting the HARQ-ACK feedback.

Figure 8:
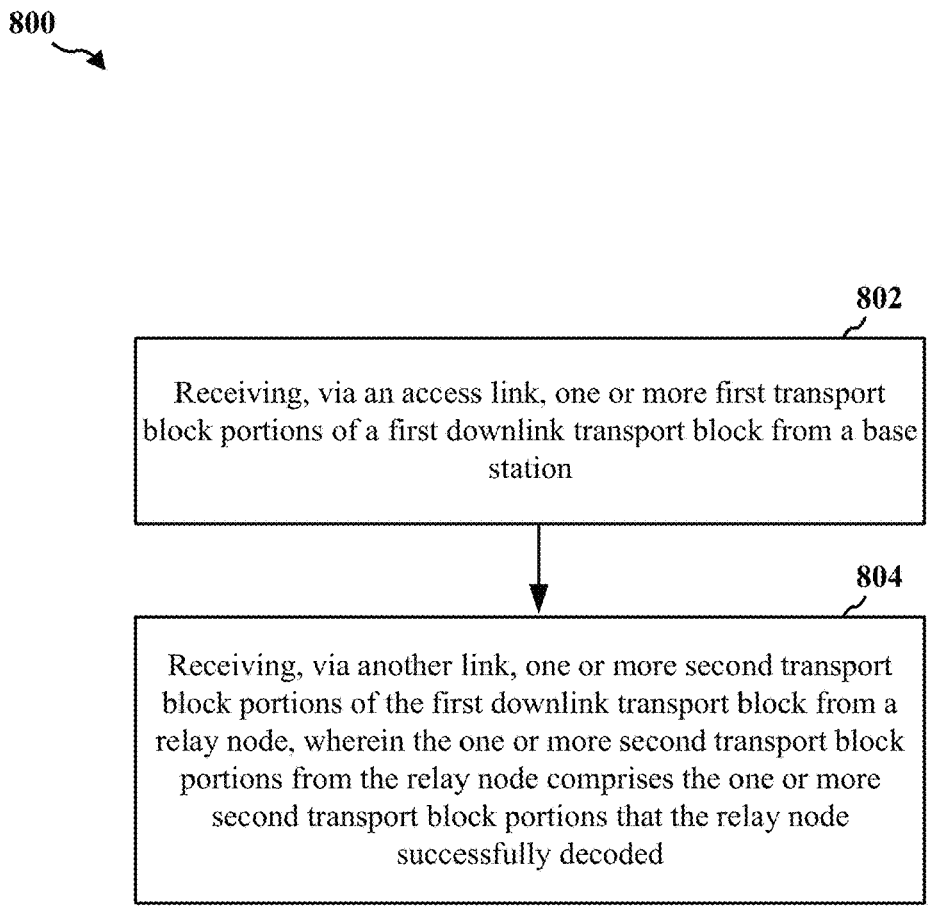
FIG. 8 is a flowchart of an example method of wireless communication of a receiving UE operable in the system of FIG. 1, in accordance with various aspects of the present description.

In some implementations of method 700, the plurality of first transport block portions and the one or more second transport block portions are code block groups Referring to FIG. 8, an example method 800 of wireless communication may be performed by a receiving UE, e.g., the sidelink-assisted multi-link UE 104*a*.

At 802, method 800 includes receiving, via an access link, one or more first transport block portions of a first downlink transport block from a base station. For example, the sidelink-assisted multi-link UE 104*a*, the processor 1212 and/or the UE multi-link communication component 125 may receive, via an access link 120*a*, one or more first transport block portions (or CBGs) of a first downlink transport block from a base station 102*a*. Accordingly, the sidelink-assisted multi-link UE 104*a*, the processor 1212 and/or the UE multi-link communication component 125 may provide means for receiving one or more first transport block portions (or CBGs) of a first downlink transport block from a base station 102*a*.

At 804, method 800 includes receiving, via another link, one or more second transport block portions of the first downlink transport block from a relay node, wherein the one or more second transport block portions received from the relay node comprise the one or more second transport block portions that the relay node successfully decoded. For example, the sidelink-assisted multi-link UE 104*a*, the processor 1212 and/or the UE multi-link communication component 125 may receive, via another link (e.g., 158*a*), one or more second transport block portions (or CBGs) of the first downlink transport block from a relay node 104*b*, wherein the one or more second transport block portions (or CBGs) received from the relay node 104*b* comprise the one or more second transport block portions (or CBGs) that the relay node 104*b* successfully decoded. Accordingly, the sidelink-assisted multi-link UE 104*a*, the processor 1212 and/or the UE multi-link communication component 125 may provide means for receiving one or more second transport block portions (or CBGs) of a first downlink transport block from a relay node 104*b*.

In some implementations of method 800, method 800 may further include decoding the one or more first transport block portions, decoding the one or more second transport block portions and soft combining the decoded one or more first transport block portions and the second decode one or more second transport block portions to define a soft combined transport block portions. For example, the sidelink-assisted multi-link UE 104*a*, the processor 1212 and/or the UE multi-link communication component 125 may decode the one or more first transport block portions (or CBGs), decode the one or more second transport block portions (or CBGs) and soft combines the decoded one or more first transport block portions (or CBGs) and the second decoded one or more second transport block portions (or CBGs) to define a soft combined transport block portions (or CBGs). Accordingly, the sidelink-assisted multi-link UE 104*a*, the processor 1212 and/or the UE multi-link communication component 125 may provide means for decoding the one or more first transport block portions (or CBGs), means for decoding the one or more second transport block portions (or CBGs) and means for soft combining the decoded one or more first transport block portions (or CBGs) and the second decoded one or more second transport block portions (or CBGs) to define a soft combined transport block portions (or CBGs).

In some implementations of method 800, method 800 may further include soft combining the one or more first transport block portions and the one or more second transport block portions and decode the soft combined transport block portions. For example, the sidelink-assisted multi-link UE 104*a*, the processor 1212 and/or the UE multi-link communication component 125 may soft combine the one or more first transport block portions (or CBGs) and the second one or more second transport block portions (or CBGs) and decodes the soft combined transport block portions (or CBGs). Accordingly, the sidelink-assisted multi-link UE 104*a*, the processor 1212 and/or the UE multi-link communication component 125 may provide means for soft combining the one or more first transport block portions (or CBGs) and the second one or more second transport block portions (or CBGs) and means for decoding the soft combined transport block portions (or CBGs).

In some implementations of method 800, method 800 may further include decoding at least one of the first transport block portions or the one or more second transport block portions and sending, to at least one of the base station or the relay node, HARQ-ACK feedback. For example, the sidelink-assisted multi-link UE 104*a*, the processor 1212 and/or the UE multi-link communication component 125 may decode one or both of the first transport block portions (or CBGs) or the one or more second transport block portions (or CBGs) and sends HARQ-ACK feedback to one or both of the base station 102*a* or the relay node 104*b*. Accordingly, the sidelink-assisted multi-link UE 104*a*, the processor 1212 and/or the UE multi-link communication component 125 may provide means for decoding one or both of the first transport block portions (or CBGs) or the one or more second transport block portions (or CBGs) and means for sending HARQ-ACK feedback to one or both of the base station 102*a* or the relay node 104*b*

In some implementations of method 800, method 800 may further include receiving, from at least one of the base station or the relay node, a retransmission of each of the transport block portions corresponding to each NACK in the HARQ-ACK feedback. For example, the sidelink-assisted multi-link UE 104*a*, the processor 1212 and/or the UE multi-link communication component 125 may receive, from one or both of the base station 102*a* or the relay node 104*b*, a retransmission of each of the transport block portions (or CBGs) corresponding to each NACK in the HARQ-ACK feedback. Accordingly, the sidelink-assisted multi-link UE 104*a*, the processor 1212 and/or the UE multi-link communication component 125 may provide means for receiving a retransmission of each of the transport block portions (or CBGs) corresponding to each NACK in the HARQ-ACK feedback.

Figure 9:
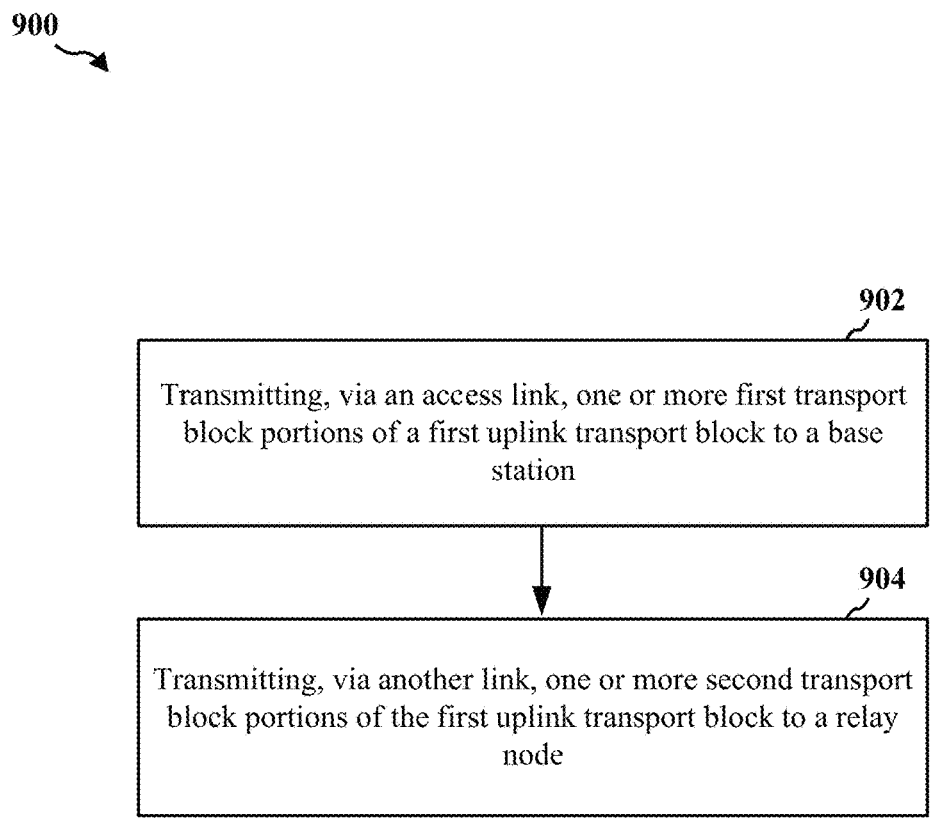
FIG. 9 is a flowchart of an example method of wireless communication of a transmitting UE operable in the system of FIG. 1, in accordance with various aspects of the present description.

Referring to FIG. 9, an example method 900 of wireless communication may be performed by a transmitting UE, such as the sideline-assisted multi-link UE 104.

At 902, method 900 includes transmitting, via an access link, one or more first transport block portions of a first uplink transport block to a base station. For example, the sidelink-assisted multi-link UE 104*a*, the processor 1212 and/or the UE multi-link communication component 125 may transmit, via an access link 120*a*, one or more first transport block portions (or CBGs) to a base station 102*a*. Accordingly, the sidelink-assisted multi-link UE 104*a*, the processor 1212 and/or the UE multi-link communication component 125 may provide means for transmitting one or more first transport block portions (or CBGs) to a base station 102*a*.

At 904, method 900 includes transmitting, via another link, one or more second transport block portions of the first uplink transport block to a relay node. For example, the sidelink-assisted multi-link UE 104*a*, the processor 1212 and/or the UE multi-link communication component 125 may transmit, via another link 158*a*, one or more second transport block portions (or CBGs) to a relay node 104*b*. Accordingly, the sidelink-assisted multi-link UE 104*a*, the processor 1212 and/or the UE multi-link communication component 125 may provide means for transmitting one or more second transport block portions (or CBGs) to a relay node 104*b*.

For example, the sideline-assisted multi-link UE 104*a* transmits $CBG_1$ and $CBG_3$ to the base station 102*a* and transmits $CBG_2$ and $CBG_4$ to the relay node 104*b*, where $CBG_{1-4}$ are all or part of an uplink transport block. In another example, the sideline-assisted multi-link UE 104*a* transmits $CBG_1$ and $CBG_3$ to the base station 102*a* and transmits $CBG_1$ and $CBG_3$ to the relay node 104*b*, where $CBG_1$ and $CBG_3$ are part of an uplink transport block.

Figure 10:
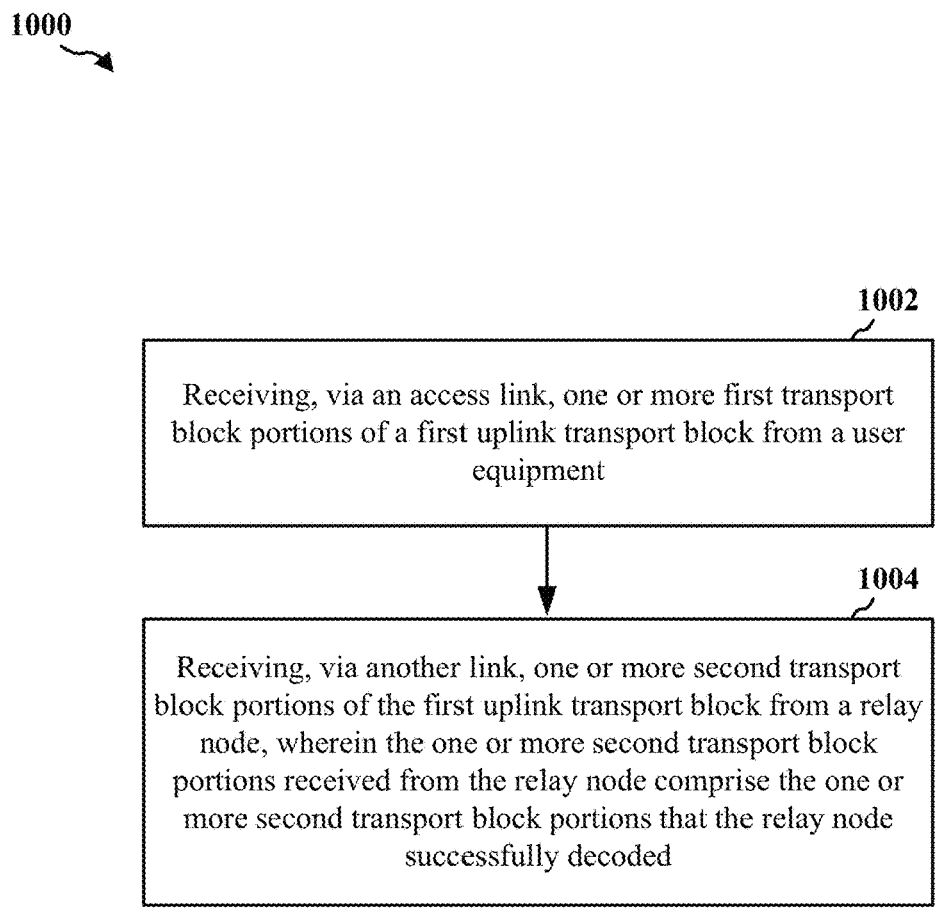
FIG. 10 is a flowchart of an example method of wireless communication of a base station operable in the system of FIG. 1, in accordance with various aspects of the present description.

Referring to FIG. 10, an example method 1000 of wireless communication may be performed by the base station 102*a*.

At 1002, method 1000 includes receiving, via an access link, one or more first transport block portions of a first uplink transport block from a user equipment (UE). For example, the base station 102*a*, the processor 1312 and/or the base station multi-link communication component 127 may receive, via an access link 120*a*, one or more first transport block portions (or CBGs) of a first uplink transport block from a sidelink-assisted multi-link UE 104*a*. Accordingly, the base station 102*a*, the processor 1312 and/or the base station multi-link communication component 127 may provide means for receiving one or more first transport block portions (or CBGs) of a first uplink transport block from a sidelink-assisted multi-link UE 104*a*.

At 1004, method 1000 includes receiving, from another link, one or more second transport block portions of the first uplink transport block from a relay node, wherein the one or more second transport block portions received from the relay node comprise the one or more second transport block portions that the relay node successfully decoded. For example, the base station 102*a*, the processor 1312 and/or the base station multi-link communication component 127 may receive, from another link 120*b*, one or more second transport block portions (or CBGs) of the first uplink transport block from a relay node 104*b*, wherein the one or more second transport block portions (or CBGs) received from the relay node 104*b* comprise the one or more second transport block portions (or CBGs) that the relay node 104*b* successfully decoded. Accordingly, the base station 102*a*, the processor 1312 and/or the base station multi-link communication component 127 may provide means for receiving one or more second transport block portions (or CBGs) of the first uplink transport block from a relay node 104*b*.

In some implementations of method 1000, method 1000 may further include decoding the one or more first transport block portions, decoding the one or more second transport block portions and soft combining the decoded one or more first transport block portions and the second decode one or more second transport block portions to define a soft combined transport block portions. For example, the base station 102*a*, the processor 1312 and/or the base station multi-link communication component 127 may decode the one or more first transport block portions (or CBGs), decodes the one or more second transport block portions (or CBGs) and soft combines the decoded one or more first transport block portions (or CBGs) and the second decoded one or more second transport block portions (or CBGs) to define a soft combined transport block portions (or CBGs). Accordingly, the base station 102*a*, the processor 1312 and/or the base station multi-link communication component 127 may provide means for decoding the one or more first transport block portions (or CBGs), means for decoding the one or more second transport block portions (or CBGs) and means for soft combining the decoded one or more first transport block portions (or CBGs) and the second decoded one or more second transport block portions (or CBGs) to define a soft combined transport block portions (or CBGs).

In some implementations of method 1000, method 1000 may further include soft combining the one or more first transport block portions and the one or more second transport block portions and decode the soft combined transport block portions. For example, the base station 102*a*, the processor 1312 and/or the base station multi-link communication component 127 may soft combine the one or more first transport block portions (or CBGs) and the second one or more second transport block portions (or CBGs) and decodes the soft combined transport block portions (or CBGs). Accordingly, the base station 102*a*, the processor 1312 and/or the base station multi-link communication component 127 may provide means for soft combining the one or more first transport block portions (or CBGs) and the second one or more second transport block portions (or CBGs) and means for decoding the soft combined transport block portions (or CBGs).

In some implementations of method 1000, method 1000 may further include decoding at least one of the first transport block portions or the one or more second transport block portions and sending, to at least one of the UE or the relay node, a retransmission grant. For example, the base station 102*a*, the processor 1312 and/or the base station multi-link communication component 127 may decode one or both of the first transport block portions (or CBGs) or the one or more second transport block portions (or CBGs) and sends a retransmission grant to one or both of the sidelink-assisted multi-link UE 104*a* or the relay node 104*b*. Accordingly, the base station 102*a*, the processor 1312 and/or the base station multi-link communication component 127 may provide means for decoding one or both of the first transport block portions (or CBGs) or the one or more second transport block portions (or CBGs) and means for sending a retransmission grant to one or both of the sidelink-assisted multi-link UE 104*a* or the relay node 104*b*.

In some implementations of method 1000, method 1000 may further include receiving, from at least one of the UE or the relay node, a retransmission of each of the transport block portions corresponding to the one or more transport block portions indicated in the retransmission grant. For example, the base station 102*a*, the processor 1312 and/or the base station multi-link communication component 127 may receive, from one or both of the sidelink-assisted multi-link UE 104*a* or the relay node 104*b*, a retransmission of each of the transport block portions (or CBGs) corresponding to the one or more transport block portions indicated in the retransmission grant. Accordingly, the base station 102*a*, the processor 1312 and/or the base station multi-link communication component 127 may provide means for receiving a retransmission of each of the transport block portions (or CBGs) corresponding to the one or more transport block portions indicated in the retransmission grant.

Figure 11:
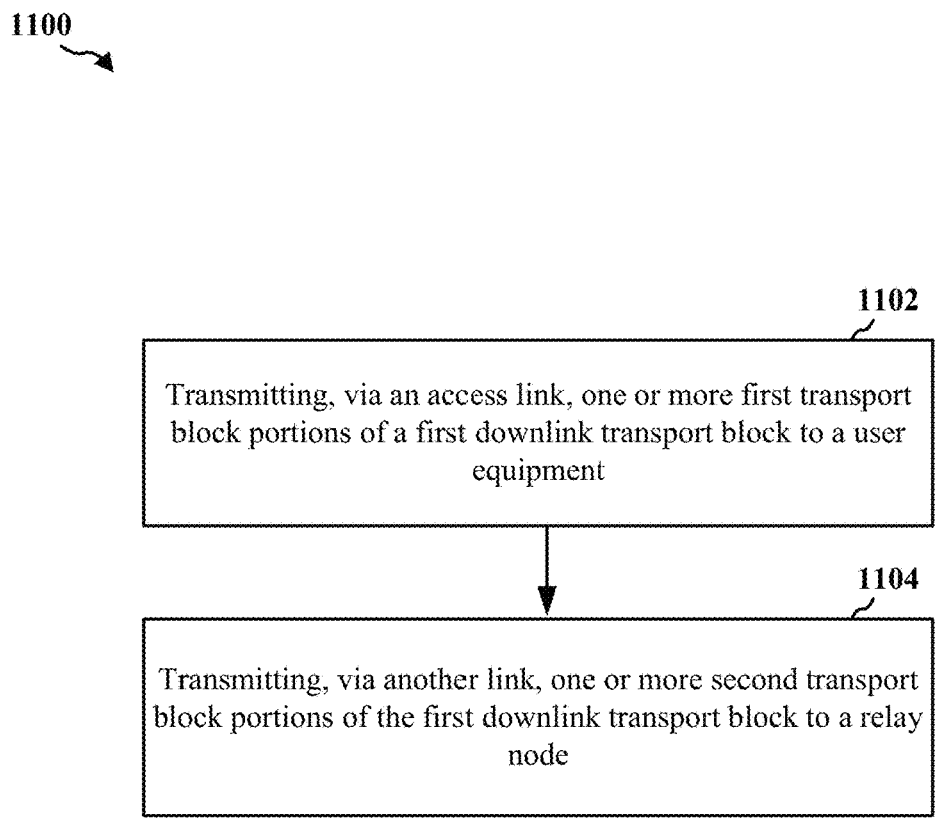
FIG. 11 is flowchart of another example method of wireless communication of a base station operable in the system of FIG. 1, in accordance with various aspects of the present description.

Referring to FIG. 11, an example method 1100 of wireless communication may be performed by the base station 102a.

At 1102, method 1100 includes transmitting, via an access link, one or more first transport block portions of a first downlink transport block to a user equipment (UE). For example, the base station 102a, the processor 1312 and/or the base station multi-link communication component 127 may transmit, via an access link 120a, one or more first transport block portions (or CBGs) of a first downlink transport block to a sideline-assisted multi-link UE 104a. Accordingly, the base station 102a, the processor 1312 and/or the base station multi-link communication component 127 may provide means for transmitting one or more first transport block portions (or CBGs) of a first downlink transport block to a sideline-assisted multi-link UE 104a.

At 1104, method 1100 includes transmitting, via another link, one or more second transport block portions of the first downlink transport block to a relay node. For example, the base station 102a, the processor 1312 and/or the base station multi-link communication component 127 may transmit, via another link 120b, one or more second transport block portions (or CBGs) of the first downlink transport block to a relay node 104b. Accordingly, the base station 102a, the processor 1312 and/or the base station multi-link communication component 127 may provide means for transmitting one or more second transport block portions (or CBGs) of the first downlink transport block to a relay node 104b.

For example, the base station 102a transmits $CBG_1$ and $CBG_3$ to the sideline-assisted multi-link UE 104a and transmits $CBG_2$ and $CBG_4$ to the relay node 104b, where $CBG_{1-4}$ are all or part of a downlink transport block. In another example, the base station 102a transmits $CBG_1$ and $CBG_1$ to the sideline-assisted multi-link UE 104a and transmits $CBG_1$ and $CBG_1$ to the relay node 104b, where $CBG_1$ is part of a downlink transport block.

Figure 12:
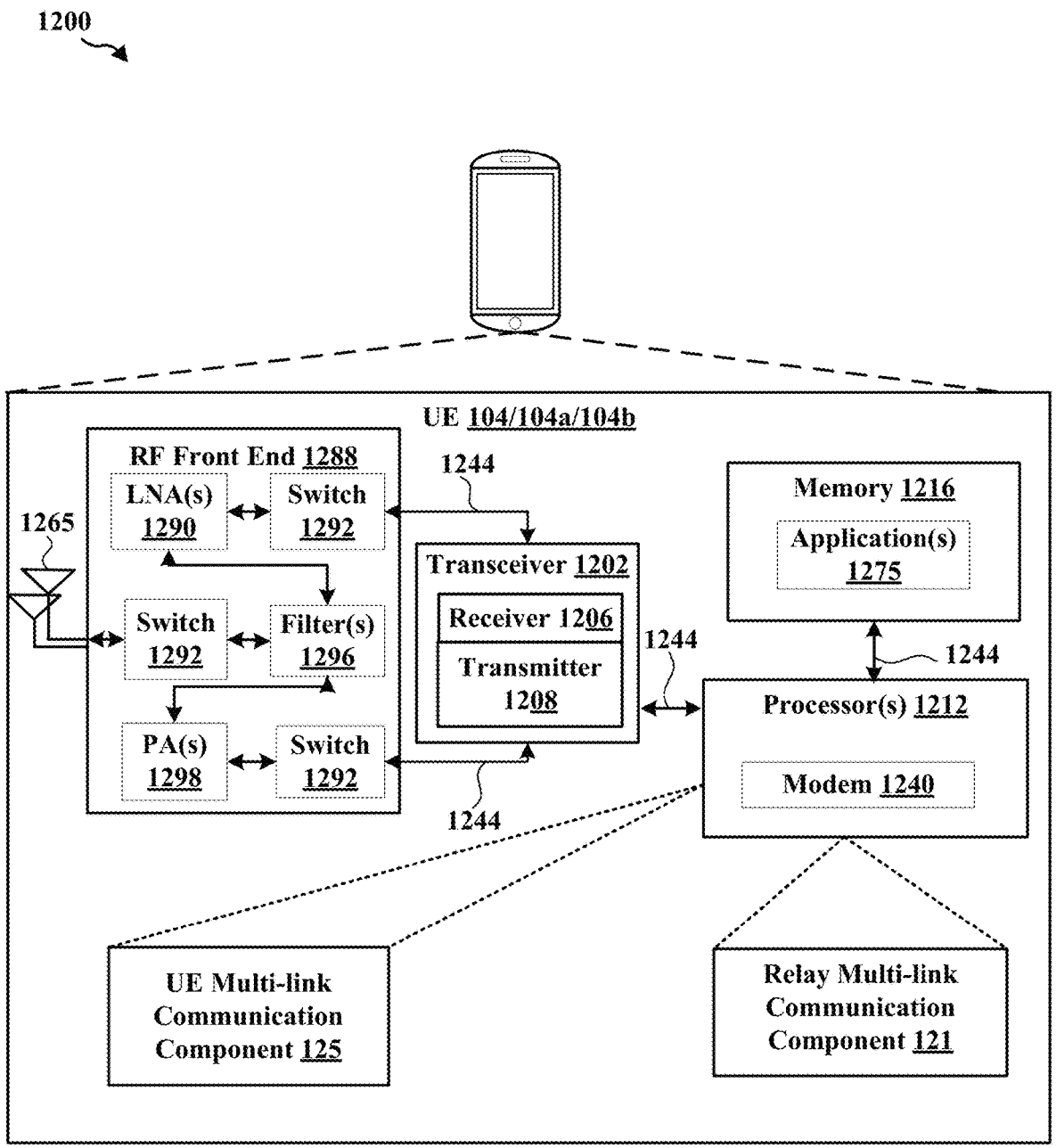
FIG. 12 is a block diagram of an example UE, in accordance with various aspects of the present description.

Referring to FIG. 12, one example of an implementation of UE 104 may include a variety of components, some of which have already been described above and are described further herein, including components such as one or more processors 1212 and memory 1216 and transceiver 1202 in communication via one or more buses 1244, which may operate in conjunction with modem 1240 and/or configuration component 198 for communicating sidelink capability information.

In an aspect, the one or more processors 1212 may include a modem 1240 and/or may be part of the modem 1240 that uses one or more modem processors. Thus, the various functions related to configuration component 198 may be included in modem 1240 and/or processors 1212 and, in an aspect, may be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1240 associated with configuration component 198 may be performed by transceiver 1202.

Also, memory 1216 may be configured to store data used herein and/or local versions of applications 1275 or communicating component 1242 and/or one or more of its subcomponents being executed by at least one processor 1212. Memory 1216 may include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be anon-transitory computer-readable storage medium that stores one or more computer-executable codes defining configuration component 198 and/or one or more of its subcomponents, and/or data associated therewith, when UE 104 is operating at least one processor 1212 to execute configuration component 198 and/or one or more of its subcomponents.

Transceiver 1202 may include at least one receiver 1206 and at least one transmitter 1208. Receiver 1206 may include hardware and/or software executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware and/or software executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and may include one or more low-noise amplifiers (LNAs) 1290, one or more switches 1292, one or more power amplifiers (PAs) 1298, and one or more filters 1296 for transmitting and receiving RF signals. The one or more antennas 1265 may include one or more antennas, antenna elements, and/or antenna arrays.

In an aspect, LNA 1290 may amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 may be used by RF front end 1288 to filter a received signal to obtain an input RF signal. Similarly, in an aspect, for example, a respective filter 1296 may be used to filter an output from a respective PA 1298 to produce an output signal for transmission. In an aspect, each filter 1296 may be connected to a specific LNA 1290 and/or PA 1298. In an aspect, RF front end 1288 may use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 may communicate with, for example, one or more base stations 102 or one or more cells associated with one or more base stations 102. In an aspect, for example, modem 1240 may configure transceiver 1202 to operate at a specified frequency and power level based on the UE configuration of the UE 104 and the communication protocol used by modem 1240.

In an aspect, modem 1240 may be a multiband-multimode modem, which may process digital data and communicate with transceiver 1202 such that the digital data is sent and received using transceiver 1202. In an aspect, modem 1240 may be multiband and be configured to support multiple frequency bands for a specific communications protocol. In an aspect, modem 1240 may be multimode and be configured to support multiple operating networks and communications protocols. In an aspect, modem 1240 may control one or more components of UE 104 (e.g., RF front end 1288, transceiver 1202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

In an aspect, the processor(s) 1212 may correspond to one or more of the processors described in connection with the UE in FIG. 3. Similarly, the memory 1216 may correspond to the memory described in connection with the UE in FIG. 3.

Figure 13:
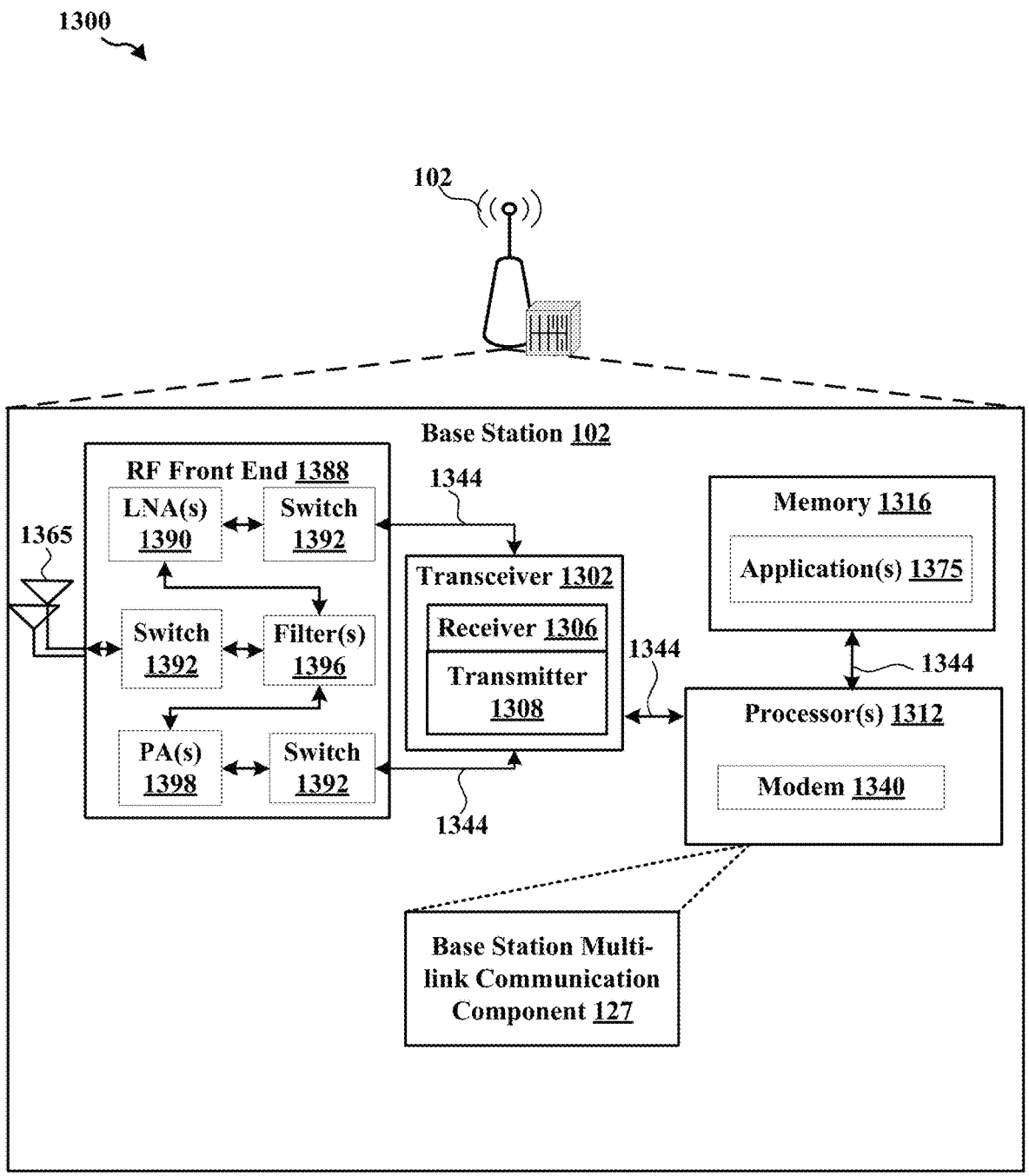
FIG. 13 is a block diagram of an example base station, in accordance with various aspects of the present description.

Referring to FIG. 13, one example of an implementation of base station 102 (e.g., a base station 102, as described above) may include a variety of components, some of which have already been described above, but including components such as one or more processors 1312 and memory 1316 and transceiver 1302 in communication via one or more buses 1344, which may operate in conjunction with modem 1340 and base station multi-link communication component 127.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

In an aspect, the processor(s) 1312 may correspond to one or more of the processors described in connection with the base station in FIG. 3. Similarly, the memory 1316 may correspond to the memory described in connection with the base station in FIG. 3.

SOME FURTHER EXAMPLE IMPLEMENTATIONS

An example method of wireless communications by a relay node, comprising receiving, via a first link, one or more first transport block portions of a first transport block; attempting to decode each of the first transport block portions; encoding each successfully decoded first transport block portions to define one or more second transport block portions; and transmitting, via a second link, the one or more second transport block portions.

The above method of wireless communications by a relay node, wherein the one or more received first transport block portions is transmitted by a base station or a transmitting user equipment (UE) and is duplicative of at least one transport block portion that is transmitted by the base station or the transmitting UE to another network entity.

Any of the above method of wireless communications by a relay node, wherein the one or more received first transport block portions is transmitted by a base station or a transmitting user equipment (UE) and is different from at least one transport block portion that is transmitted by the base station or the transmitting UE to another network entity.

Any of the above method of wireless communications by a relay node, further comprising transmitting a sidelink control message comprising an index of the one or more second transport block portions to a receiving user equipment (UE), with the index indicating which of the first transport block portions were successfully decoded.

Any of the above method of wireless communications by a relay node, further comprising receiving, from a receiving user equipment (UE), HARQ-ACK feedback for the second transport block portions that the receiving UE received.

Any of the above method of wireless communications by a relay node, further comprising retransmitting, to the receiving UE, each of the second transport block portions corresponding to each NACK in the received HARQ-ACK feedback.

Any of the above method of wireless communications by a relay node, further comprising transmitting, to a base station that transmitted the one or more first transport block portions, the HARQ-ACK feedback.

Any of the above method of wireless communications by a relay node, further comprising transmitting an uplink control message comprising an index of the one or more second transport block portions to a base station, with the index indicating which of the first transport block portions were successfully decoded.

Any of the above method of wireless communications by a relay node, further comprising receiving, from the base station, HARQ-ACK feedback for the second transport block portions that the base station received; and retransmitting, to the base station, each of the second transport block portions corresponding to each NACK in the received HARQ-ACK feedback.

Any of the above method of wireless communications by a relay node, further comprising receiving, from the base station, a retransmission grant for the second transport block portions that the base station received; and retransmitting, to the base station, each of the second transport block portions corresponding to the one or more transport block portions indicated in the retransmission grant.

Any of the above method of wireless communications by a relay node, further comprising transmitting, to a receiving user equipment (UE), the HARQ-ACK feedback.

A relay node for wireless communication, comprising a memory configured to store instructions; and one or more processors communicatively coupled with the memory, wherein the one or more processors are configured to execute the instructions to perform the operations of any of the above methods of wireless communications for a relay node.

A relay node for wireless communication, comprising means for performing the operations of any of the above methods of wireless communications for a relay node.

A non-transitory computer-readable medium storing instructions executable by one or more processors to perform the operations of any of the above methods of wireless communications for a relay node.

An example method of wireless communications by a user equipment (UE), comprising receiving, via an access link, one or more first transport block portions of a first downlink transport block from a base station; and receiving, from another link, one or more second transport block portions of the first downlink transport block from a relay node; wherein the one or more second transport block portions received from the relay node comprise the one or more second transport block portions that the relay node successfully decoded.

Any of the above method of wireless communications by a UE, further comprising decoding the one or more first transport block portions; decoding the one or more second transport block portions; and soft combining the decoded one or more first transport block portions and the second decoded one or more second transport block portions to define a soft combined transport block portions.

Any of the above method of wireless communications by a UE, further comprising soft combining the one or more first transport block portions and the one or more second transport block portions to define a soft combined transport block portions; and decoding the soft combined transport block portions.

Any of the above method of wireless communications by a UE, further comprising decoding at least one of the first transport block portions or the one or more second transport block portions; and sending, to at least one of the base station or the relay node, HARQ-ACK feedback.

Any of the above method of wireless communications by a UE, further comprising: receiving, from at least one of the base station or the relay node, a retransmission of each of the transport block portions corresponding to each NACK in the HARQ-ACK feedback.

An example method of wireless communications by a user equipment (UE), comprising transmitting, via an access link, one or more first transport block portions of a first uplink transport block to a base station; and transmitting, via another link, one or more second transport block portions of the first uplink transport block to a relay node.

A user equipment (UE) for wireless communication, comprising a memory configured to store instructions; and one or more processors communicatively coupled with the memory, wherein the one or more processors are configured to execute the instructions to perform the operations of any of the above methods of wireless communications for a UE.

A user equipment (UE) for wireless communication, comprising means for performing the operations of any of the above methods of wireless communications for a UE.

A non-transitory computer-readable medium storing instructions executable by one or more processors to perform the operations of any of the above methods of wireless communications for a UE.

An example method of wireless communications by a base station, comprising receiving, via an access link, one or more first transport block portions of a first uplink transport block from a user equipment (UE); and receiving, from another link, one or more second transport block portions of the first uplink transport block from a relay node; wherein the one or more second transport block portions received from the relay node comprise the one or more second transport block portions that the relay node successfully decoded.

The above method of wireless communications by a base station, further comprising decoding the one or more first transport block portions; decoding the one or more second transport block portions; and soft combining the decoded one or more first transport block portions and the second decoded one or more second transport block portions to define a soft combined transport block portions.

Any of the above method of wireless communications by a base station, further comprising soft combining the one or more first transport block portions and the one or more second transport block portions to define a soft combined transport block portions; and decoding the soft combined transport block portions.

Any of the above method of wireless communications by a base station, further comprising decoding at least one of the first transport block portions or the one or more second transport block portions; and sending, to at least one of the UE or the relay node, a retransmission grant.

Any of the above method of wireless communications by a base station, further comprising receiving, from at least one of the UE or the relay node, a retransmission of each of the transport block portions corresponding to the one or more transport block portions indicated in the retransmission grant.

An example method of wireless communications by a base station, comprising transmitting, via an access link, one or more first transport block portions of a first downlink transport block to a user equipment (UE); and transmitting, via another link, one or more second transport block portions of the first downlink transport block to a relay node.

A base station for wireless communication, comprising a memory configured to store instructions; and one or more processors communicatively coupled with the memory, wherein the one or more processors are configured to execute the instructions to perform the operations of one or more of any of the above methods of wireless communications for a base station.

A base station for wireless communication, comprising means for performing the operations of any of the above methods of wireless communications for a base station.

A non-transitory computer-readable medium storing instructions executable by one or more processors to perform the operations of any of the above methods of wireless communications for a base station.

According to an example, a method of wireless communications by a relay node is provided. The method may include receiving, via a first link, one or more first transport block portions of a first transport block. The method may further include attempting to decode each of the first transport block portions. The method may further include encoding each successfully decoded first transport block portions to define one or more second transport block portions. The method may further include transmitting, via a second link, the one or more second transport block portions.

According to another example, a method of wireless communications by a user equipment (UE) is provided. The method may include receiving, via an access link, one or more first transport block portions of a first downlink transport block from a base station. The method may further include receiving, from another link, one or more second transport block portions of the first downlink transport block from a relay node. The one or more second transport block portions received from the relay node comprise the one or more second transport block portions that the relay node successfully decoded.

According to another example, a method of wireless communications by a user equipment (UE is provided. The method may include transmitting, via an access link, one or more first transport block portions of a first uplink transport block to a base station. The method may further include transmitting, via another link, one or more second transport block portions of the first uplink transport block to a relay node.

According to another example, a method of wireless communications by a base station is provided. The method may include receiving, via an access link, one or more first transport block portions of a first uplink transport block from a user equipment (UE). The method may further include receiving, from another link, one or more second transport block portions of the first uplink transport block from a relay node. The one or more second transport block portions received from the relay node comprise the one or more second transport block portions that the relay node successfully decoded.

According to another example, a method of wireless communications by a base station is provided. The method may include transmitting, via an access link, one or more first transport block portions of a first downlink transport block to a user equipment (UE). The method may further include transmitting, via another link, one or more second transport block portions of the first downlink transport block to a relay node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a relay node, comprising:
   receiving, via a first link, one or more first transport block portions of a first transport block;
   attempting to decode each of the first transport block portions;
   encoding each successfully decoded first transport block portions to define one or more second transport block portions;
   transmitting, via a second link, the one or more second transport block portions; and
   transmitting a sidelink control message comprising an index of the one or more second transport block portions to a receiving user equipment (UE) in response to the encoding, with the index indicating which of the first transport block portions were successfully decoded.

2. The method of claim 1, wherein the one or more received first transport block portions is transmitted by a base station or a transmitting user equipment (UE) and is duplicative of at least one transport block portion that is transmitted by the base station or the transmitting UE to another network entity.

3. The method of claim 1, wherein the one or more received first transport block portions is transmitted by a base station or a transmitting user equipment (UE) and is different from at least one transport block portion that is transmitted by the base station or the transmitting UE to another network entity.

4. The method of claim 1, further comprising:
   receiving, from a receiving user equipment (UE), HARQ-ACK feedback for the second transport block portions that the receiving UE received.

5. The method of claim 4, further comprising:
   retransmitting, to the receiving UE, each of the second transport block portions corresponding to each NACK in the received HARQ-ACK feedback.

6. The method of claim 4, further comprising:
   transmitting, to a base station that transmitted the one or more first transport block portions, the HARQ-ACK feedback.

7. The method of claim 1, further comprising:
   transmitting an uplink control message comprising an index of the one or more second transport block portions to a base station, with the index indicating which of the first transport block portions were successfully decoded.

8. The method of claim 7, further comprising:
   receiving, from the base station, HARQ-ACK feedback for the second transport block portions that the base station received; and
   retransmitting, to the base station, each of the second transport block portions corresponding to each NACK in the received HARQ-ACK feedback.

9. The method of claim 8, further comprising:
receiving, from the base station, a retransmission grant for the second transport block portions that the base station received; and
retransmitting, to the base station, each of the second transport block portions corresponding to the one or more transport block portions indicated in the retransmission grant.

10. The method of claim 8, further comprising:
transmitting, to a receiving user equipment (UE), the HARQ-ACK feedback.

11. A relay node for wireless communication, comprising:
a memory configured to store instructions; and
one or more processors communicatively coupled with the memory, wherein the one or more processors are configured to execute the instructions to:
receive, via a first link, one or more first transport block portions of a first transport block;
attempt to decode each of the first transport block portions;
encode each successfully decoded first transport block portions to define one or more second transport block portions;
transmit, via a second link, the one or more second transport block portions; and
transmit a sidelink control message comprising an index of the one or more second transport block portions to a receiving user equipment (UE) in response to the encoding, with the index indicating which of the first transport block portions were successfully decoded.

12. The relay node of claim 11, wherein the one or more received first transport block portions is transmitted by a base station or a transmitting user equipment (UE) and is duplicative of at least one transport block portion that is transmitted by the base station or the transmitting UE to another network entity.

13. The relay node of claim 11, wherein the one or more received first transport block portions is transmitted by a base station or a transmitting user equipment (UE) and is different from at least one transport block portion that is transmitted by the base station or the transmitting UE to another network entity.

14. The relay node of claim 11, wherein the one or more processors are configured to:
receive, from a receiving user equipment (UE), HARQ-ACK feedback for the second transport block portions that the receiving UE received.

15. The relay node of claim 14, wherein the one or more processors are configured to:
retransmit, to the receiving UE, each of the second transport block portions corresponding to each NACK in the received HARQ-ACK feedback.

16. The relay node of claim 14, wherein the one or more processors are configured to:
transmit, to a base station that transmitted the one or more first transport block portions, the HARQ-ACK feedback.

17. The relay node of claim 11, wherein the one or more processors are configured to:
transmit an uplink control message comprising an index of the one or more second transport block portions to a base station, with the index indicating which of the first transport block portions were successfully decoded.

18. The relay node of claim 17, wherein the one or more processors are configured to:
receive, from the base station, HARQ-ACK feedback for the second transport block portions that the base station received; and
retransmit, to the base station, each of the second transport block portions corresponding to each NACK in the received HARQ-ACK feedback.

19. The relay node of claim 18, wherein the one or more processors are configured to:
receive, from the base station, a retransmission grant for the second transport block portions that the base station received; and
retransmit, to the base station, each of the second transport block portions corresponding to the one or more transport block portions indicated in the retransmission grant.

20. The relay node of claim 18, wherein the one or more processors are configured to:
transmit, to a receiving user equipment (UE), the HARQ-ACK feedback.

21. A relay node for wireless communication, comprising:
means for receiving, via a first link, one or more first transport block portions of a first transport block;
means for attempting to decode each of the first transport block portions;
means for encoding each successfully decoded first transport block portions to define one or more second transport block portions;
means for transmitting, via a second link, the one or more second transport block portions; and
means for transmitting a sidelink control message comprising an index of the one or more second transport block portions to a receiving user equipment (UE) in response to the encoding, with the index indicating which of the first transport block portions were successfully decoded.

22. A non-transitory computer-readable medium storing instructions executable by one or more processors to:
receive, via a first link, one or more first transport block portions of a first transport block;
attempt to decode each of the first transport block portions;
encode each successfully decoded first transport block portions to define one or more second transport block portions;
transmit, via a second link, the one or more second transport block portions; and
transmit a sidelink control message comprising an index of the one or more second transport block portions to a receiving user equipment (UE) in response to the encoding, with the index indicating which of the first transport block portions were successfully decoded.

23. The non-transitory computer-readable medium of claim 22, wherein the one or more received first transport block portions is transmitted by a base station or a transmitting user equipment (UE) and is duplicative of at least one transport block portion that is transmitted by the base station or the transmitting UE to another network entity.

24. The non-transitory computer-readable medium of claim 22, wherein the one or more received first transport block portions is transmitted by a base station or a transmitting user equipment (UE) and is different from at least one transport block portion that is transmitted by the base station or the transmitting UE to another network entity.

25. The non-transitory computer-readable medium of claim 22, further comprising instructions executable by the one or more processors to:

receive, from a receiving user equipment (UE), HARQ-ACK feedback for the second transport block portions that the receiving UE received.

26. The non-transitory computer-readable medium of claim 25, further comprising instructions executable by the one or more processors to:
retransmit, to the receiving UE, each of the second transport block portions corresponding to each NACK in the received HARQ-ACK feedback.

27. The non-transitory computer-readable medium of claim 25, further comprising instructions executable by the one or more processors to:
transmit, to a base station that transmitted the one or more first transport block portions, the HARQ-ACK feedback.

28. The relay node of claim 21, wherein the one or more received first transport block portions is transmitted by a base station or a transmitting user equipment (UE) and is duplicative of at least one transport block portion that is transmitted by the base station or the transmitting UE to another network entity.

29. The relay node of claim 21, wherein the one or more received first transport block portions is transmitted by a base station or a transmitting user equipment (UE) and is different from at least one transport block portion that is transmitted by the base station or the transmitting UE to another network entity.

30. The relay node of claim 21, further comprising:
means for receiving, from a receiving user equipment (UE), HARQ-ACK feedback for the second transport block portions that the receiving UE received; and
means for retransmitting, to the receiving UE, each of the second transport block portions corresponding to each NACK in the received HARQ-ACK feedback.

* * * * *